(12) United States Patent
Mimatsu et al.

(10) Patent No.: US 8,222,763 B2
(45) Date of Patent: Jul. 17, 2012

(54) METHOD OF CONTROLLING DC/DC CONVERTER APPARATUS

(75) Inventors: Naoyuki Mimatsu, Utsunomiya (JP); Yasushi Kojima, Utsunomiya (JP); Yutaka Asano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 775 days.

(21) Appl. No.: 12/354,556

(22) Filed: Jan. 15, 2009

(65) Prior Publication Data

US 2009/0179623 A1 Jul. 16, 2009

(30) Foreign Application Priority Data

Jan. 16, 2008 (JP) ................................. 2008-007182

(51) Int. Cl.
*B60L 1/00* (2006.01)
(52) U.S. Cl. ........................................................ 307/9.1
(58) Field of Classification Search ................. 307/9.1
See application file for complete search history.

(56) References Cited

U.S. PATENT DOCUMENTS

| | | | |
|---|---|---|---|
| 6,043,634 A | 3/2000 | Nguyen et al. | |
| 7,129,685 B2 | 10/2006 | Nakai et al. | |
| 7,391,194 B2 * | 6/2008 | Brown | 323/283 |
| 7,656,690 B2 * | 2/2010 | Yamada et al. | 363/71 |
| 2005/0007089 A1 | 1/2005 | Niiyama et al. | |
| 2005/0212497 A1 | 9/2005 | Cha | |
| 2006/0152204 A1 | 7/2006 | Maksimovic et al. | |
| 2007/0199747 A1 | 8/2007 | Aoyagi et al. | |

FOREIGN PATENT DOCUMENTS

| | | |
|---|---|---|
| EP | 1662641 A2 | 5/2006 |
| WO | WO-02/093730 A1 | 11/2002 |
| WO | WO-2005/013467 A1 | 2/2005 |
| WO | WO-2005/081839 A2 | 9/2005 |
| WO | WO-2005/081839 A3 | 9/2005 |
| WO | WO-2007/066676 A1 | 6/2007 |

OTHER PUBLICATIONS

European Search Report for Application No. 09000458.1, dated Mar. 24, 2009.
European Search Report for Application No. 10151733.2, dated Mar. 31, 2010.

* cited by examiner

*Primary Examiner* — Hal Kaplan
(74) *Attorney, Agent, or Firm* — Nelson Mullins Riley & Scarborough LLP; Anthony A. Laurentano

(57) ABSTRACT

If a lower arm device connection period is non-zero in a previous switching cycle, a first dead time is prohibited from decreasing, and if the lower arm device connection period is zero, the first dead time is allowed to decrease, wherein the first dead time is the dead time provided after the lower arm device connection period in the previous switching cycle but before an upper arm device connection period in the current switching cycle.

9 Claims, 29 Drawing Sheets

METHOD OF CONTROLLING DC/DC CONVERTER APPARATUS

BACKGROUND OF THE INVENTION

1. Field of the Invention

The present invention relates to a method of controlling a DC/DC converter apparatus connected between two electric power devices and including upper and lower arm devices, and more particularly, to a method of controlling a DC/DC converter that can adjust a dead time provided between the connection periods of the upper and lower arm devices.

2. Description of the Related Art

A DC/DC converter is conventionally known, which alternately turns on and off two switching devices in each switching cycle for control of increasing voltage (see International Publication No. WO 02/093730, for example). In the DC/DC converter disclosed in the International Publication No. WO 02/093730, both switching devices are turned on/off with a dead time provided therebetween (see "Abstract" in the International Publication No. WO 02/093730). The dead time is provided since if the two switching devices are turned on simultaneously, a short circuit may be established to cause excessive current to pass through the circuit, thereby leading to problems such as breakdown of the switching devices and other devices connected to the DC/DC converter.

However, due to the dead time, the above-mentioned DC/DC converter cannot keep one of the switching devices ON throughout the entire switching cycle. In other words, two electric power devices cannot be coupled without any dead time (which state will be referred to herein as "directly coupled"), if the DC/DC converter is disposed between the electric power devices.

SUMMARY OF THE INVENTION

The present invention has been made in view of the above-mentioned issue, and the object of the invention is to provide a method of controlling a DC/DC converter apparatus that can directly couple two electric power devices.

In a method of controlling a DC/DC converter apparatus according to the present invention, the DC/DC converter apparatus includes a DC/DC converter connected between a first electric power device and a second electric power device, and having an upper arm device and a lower arm device; and a controller having a calculating unit and an operation command unit. The calculating unit calculates connection periods of the upper arm device and the lower arm device, and a dead time provided before connection of the upper arm device. The operation command unit alternately turns on and off the upper arm device and the lower arm device with the dead time provided therebetween, based on a calculation result of the calculating unit. The method comprises the steps of: in a permission judging unit of the calculating unit, determining, in a current calculation process, if the connection period of the lower arm device exists; when it is determined that the connection period of the lower arm device exists, prohibiting, in a next calculation process, decreasing the dead time provided before the connection of the upper arm device; and when it is determined that no connection period of the lower arm device exists, permitting, in the next calculating process, decreasing the dead time provided before the connection of the upper arm device and increasing the connection period of the upper arm device.

According to the present invention, the dead time provided before the connection of the upper arm device can be prevented in the next calculation process from being decreased when the current calculation process includes the connection period of the lower arm device, and the dead time provided before the connection of the upper arm device can be decreased and the connection period of the upper arm device increased in the next calculation process, when the current calculation process includes no connection period of the lower arm device. Thus, the dead time can be decreased such that a short circuit may not occur between the upper arm devices and the lower arm devices. As a result, the first power device and the second power device can be directly coupled to each other.

The method of controlling a DC/DC converter apparatus may further comprise the steps of: calculating, in the calculating unit, the connection periods of the upper arm device and the lower arm device and the dead time provided before the connection of the upper arm device for each of a plurality of switching cycles in a single calculation process, and transmitting calculation results to the operation command unit at one time; storing, in the operation command unit, the received calculation results into a plurality of memory units, separately and in association with an order of the plurality of switching cycles; utilizing, in the operation command unit, the calculation results stored in the plurality of memory units to alternately turn on and off the upper arm device and the lower arm device; and calculating, in the calculating unit, the connection period of the upper arm device and the dead time provided before the connection of the upper arm device in the first switching cycle of the current calculation process, based on the connection period of the lower arm device in the last switching cycle of a previous calculation process.

Hence, the calculation results for a plurality of switching cycles can be collectively calculated and transmitted. Further, since the connection period of the upper arm device and the dead time provided before the connection of the upper arm device in the first switching cycle of the current calculation process are calculated based on the connection period of the lower arm device in the last switching cycle of the previous calculation process, a short circuit between the upper arm device and the lower arm device can be prevented from occurring even if the calculation results of a plurality of switching cycles are calculated collectively. Therefore, the calculation time of the calculating unit can be reduced while a short circuit is prevented from occurring between the upper arm device and the lower arm device in the first switching cycle of the current calculation process.

In the method of controlling a DC/DC converter apparatus, the DC/DC converter apparatus may include a plurality of phase arms, each phase arm being made up of the upper arm device and the lower arm device. The method may further comprise the steps of: calculating, in the calculating unit, the connection periods of the upper arm device and the lower arm device and the dead time provided before the connection of the upper arm device for each of the plurality of phase arms in a single calculation process, and transmitting the calculation results to the operation command unit at one time; storing, in the operation command unit, the received calculation results into a plurality of memory units, separately and in association with each of the plurality of phase arms; utilizing, in the operation command unit, the calculation results stored in the plurality of memory units to alternately turn on and off the upper arm device and the lower arm device of each of a plurality of phase arms; and calculating, in the calculating unit, the connection period of the upper arm device and the dead time provided before the connection of the upper arm device for a phase arm targeted for the current calculation process, using the connection period of the lower arm device of the phase arm directly before the targeted phase arm in the current calculation process and the connection period of the lower arm device of the phase arm directly before the targeted phase arm in the previous calculation process.

Thus, the connection period of the upper arm device and the dead time provided before the connection of the upper arm device for the targeted phase arm are calculated using the lower arm device connection period for the phase arm directly before the targeted phase arm of the current calculation process and also the lower arm device connection period for the phase arm directly before the targeted phase arm of the previous calculation process. This allows a short circuit between the upper arm device and the lower arm device to be prevented more reliably. Now, assume that the following conditions are set:

(1) There are three phase arms, i.e. U-phase arm, V-phase arm, and W-phase arm.

(2) The upper arm device and the lower arm device are turned on/off in the order of U-phase arm, V-phase arm, and W-phase arm.

(3) A single calculation process handles all three phase arms in the order of U-phase arm, V-phase arm, and W-phase arm.

(4) Only one or two phase arms have their upper arm device and lower arm device actually turned on/off (in the case of PFM (Pulse Frequency Modulation) control, for example).

(5) In the previous calculation process, the connection period of the lower arm device of each of the U-phase arm, V-phase arm, and W-phase arm was non-zero. Only the calculation result of the U-phase arm was actually used (i.e., the upper arm device and the lower arm device were turned on/off only in the U-phase arm), and the calculation results of the V-phase arm and W-phase arm were not used.

(6) In the current calculation process, the lower arm device connection periods of the U-phase arm, V-phase arm, and W-phase arm were calculated to be zero. Only the calculation result of the V-phase arm was actually used (i.e., the upper arm device and the lower arm device were turned on/off only in the V-phase arm), and the calculation results of the U-phase arm and W-phase arm were not used.

In the case described above, both upper and lower arm devices of the U-phase arm were connected in the previous switching cycle. In the current switching cycle, only the upper arm device of the V-phase is to be connected. If the upper arm device connection period of the V-phase arm is calculated based on the lower arm device connection period of the U-phase arm in the current calculation process, it must be that the lower arm device connection period of the U-phase arm is zero. The previous switching cycle, however, includes a lower arm device connection period of the U-phase arm. Thus, by also referring to the lower arm device connection period of the U-phase arm in the previous calculation process, a short circuit between the lower arm device of the U-phase and the upper arm device of the V-phase can be avoided.

The method of controlling a DC/DC converter apparatus may further comprise the steps of: calculating, in the calculating unit, a dead time provided after the connection of the upper arm device; increasing, in the calculating unit, the connection period of the upper arm device as a specified duty ratio increases; utilizing, in the permission judging unit, a first duty ratio threshold at which the connection period of the lower arm device becomes zero, and a second duty ratio threshold that is greater than the first duty ratio threshold; if the specified duty ratio is between the first duty ratio threshold and the second duty ratio threshold, permitting decreasing the dead time provided after the connection of the upper arm device and increasing the connection period of the upper arm device, while prohibiting decreasing the dead time provided before the connection of the upper arm device; and if the specified duty ratio is between the second duty ratio and a possible maximum value of the duty ratio, permitting decreasing the dead time provided before the connection of the upper arm device and increasing the connection period of the upper arm device.

As a result, the dead time provided before the connection of the upper arm device is decreased only when the specified duty ratio exceeds the second duty ratio threshold. When the specified duty ratio exceeds the second duty ratio threshold, the lower arm device connection period is zero. Hence, if the previous switching cycle includes the lower arm device connection period, the dead time provided before the connection of the upper arm device in the current switching cycle is never reduced, thereby reliably preventing a short circuit from occurring between the upper arm device and the lower arm device.

In a method of controlling a DC/DC converter apparatus according to the present invention, the DC/DC converter apparatus includes a DC/DC converter connected between a first electric power device and a second electric power device, and having an upper arm device and a lower arm device; and a controller having a calculating unit and an operation command unit. The calculating unit calculates connection periods of the upper arm device and the lower arm device, and dead times provided before and after connection of the upper arm device, based on a specified duty ratio. The operation command unit alternately turns on and off the upper arm device and the lower arm device with the dead times provided therebetween, based on a calculation result of the calculating unit. The method comprises the steps of: in the calculating unit, increasing the connection period of the upper arm device as the specified duty ratio increases; utilizing a first duty ratio threshold at which the connection period of the lower arm device becomes zero, and a second duty ratio threshold that is greater than the first duty ratio threshold; if the specified duty ratio is between the first duty ratio threshold and the second duty ratio threshold, prohibiting decreasing the dead time provided before the connection of the upper arm device; and if the specified duty ratio exceeds the second duty ratio threshold, permitting decreasing the dead time provided before the connection of the upper arm device.

According to the invention, the dead time provided before the upper arm device is not decreased unless the specified duty ratio exceeds the second duty ratio threshold. Further, in order for the specified duty ratio to exceed the second duty ratio threshold, the lower arm device connection period must be zero. Hence, the presence of the lower arm device connection period in the previous switching cycle prevents the decrease in the dead time provided before the connection of the upper arm device in the current switching cycle, thereby preventing a short circuit from occurring between the upper arm device and the lower arm device with greater reliability.

Preferably, if the specified duty ratio is between the first duty ratio threshold and the second duty ratio threshold, the dead time provided after the connection of the upper arm device is gradually decreased as the specified duty ratio increases, and then the connection period of the upper arm device is gradually increased. This allows the upper arm device connection period to be increased with the decrease of the dead time provided after the connection of the upper arm device, and hence smooth control of the upper arm device connection period is achieved in accordance with the specified duty ratio.

Preferably, if the specified duty ratio is between the second duty ratio threshold and the possible maximum value of the duty ratio, the dead time provided before the connection of the upper arm device is gradually decreased and the connection period of the upper arm device is gradually increased. This allows the upper arm device connection period to be increased with the decrease of the dead time provided before the connection of the upper arm device, and hence smooth control of the upper arm device connection period is achieved in accordance with the specified duty ratio.

Furthermore, the DC/DC converter apparatus may be incorporated in a vehicle, the first electric power device may be a battery, the second electric power device may be a fuel cell and a motor, and the DC/DC converter may have a fuel cell output control mode that adjusts voltage between the fuel cell and the motor to control the output of the fuel cell, and a directly coupled mode that connects only the upper arm device to directly couple the battery, the fuel cell, and the motor. This arrangement allows the DC/DC converter apparatus, when operating in the fuel cell output control mode, to control the output of the fuel cell with the DC/DC converter. The above-mentioned arrangement also allows the DC/DC converter apparatus, when operating in the directly coupled mode, to prevent switching losses in the DC/DC converter due to the charge/discharge of the battery.

In a method of controlling a DC/DC converter apparatus according to the present invention, the DC/DC converter apparatus includes a DC/DC converter connected between a first electric power device and a second electric power device and having an upper arm device and a lower arm device, and a controller for alternately turning on and off, in each switching cycle, the upper arm device and the lower arm device with dead times provided therebetween. The method comprises the step of: when a connection period of the lower arm device is zero, keeping the upper arm device on by gradually decreasing the dead times over a plurality of the switching cycles, and finally making the dead times zero.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A. First Embodiment

Hereinafter, a fuel cell vehicle equipped with the first embodiment of a DC/DC converter apparatus according to the present invention will be described with reference to the accompanying drawings.

1. Configuration of Fuel Cell Vehicle (1) General Configuration

Figure 1:
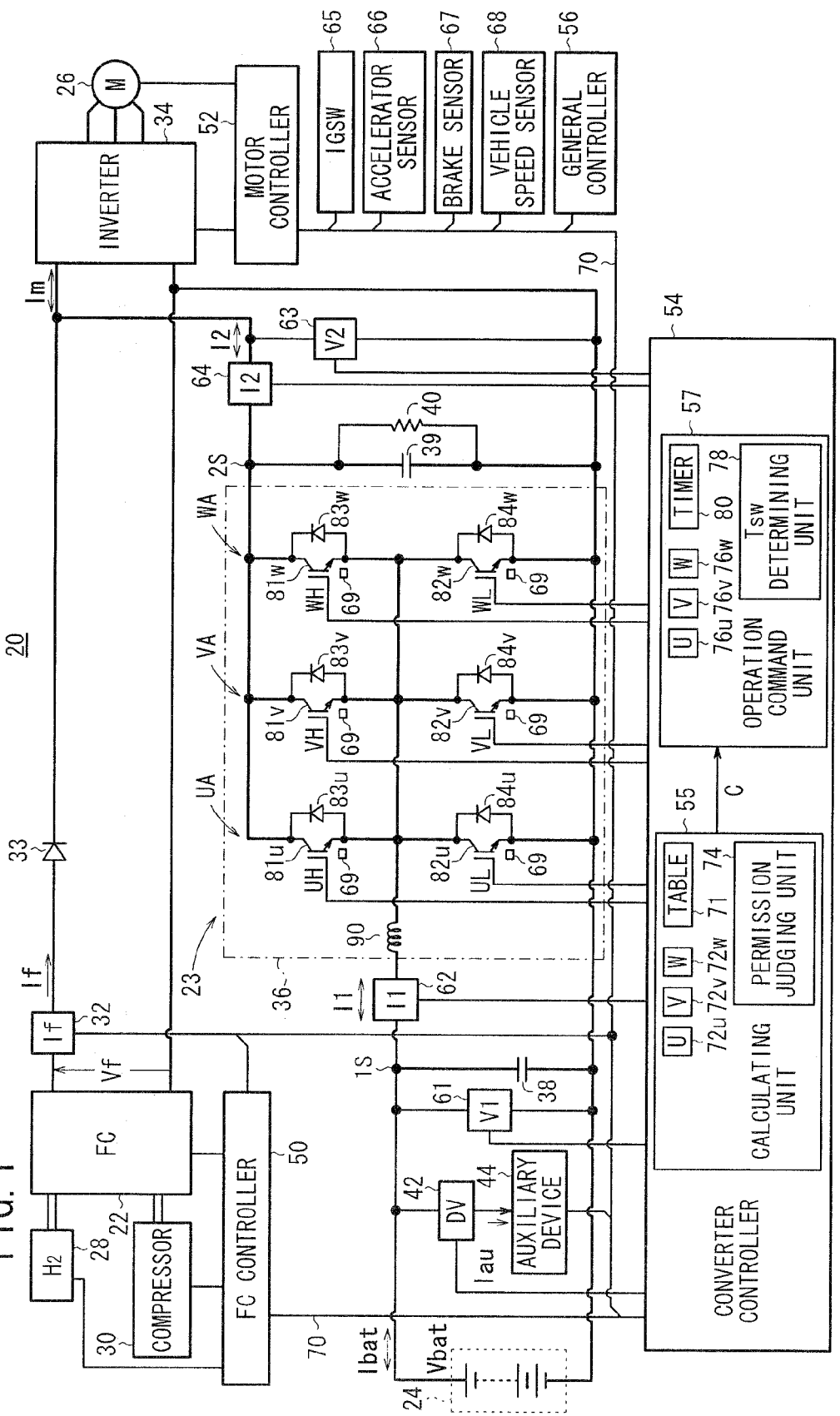
FIG. 1 is a circuit diagram of a fuel cell vehicle according to a first embodiment of the present invention.

FIG. 1 shows a fuel cell vehicle 20 according to the present embodiment. The fuel cell vehicle 20 basically includes a hybrid power supply device, a travel motor 26, and a DC/DC converter apparatus (also referred to as a "VCU (Voltage Control Unit)") 23. The hybrid power supply device includes a fuel cell 22 and a storage device 24 (referred to as a "battery") serving as an energy storage. The travel motor 26 is supplied with current (electrical power) from the hybrid power supply device via an inverter 34. The DC/DC converter apparatus 23 converts voltage between a primary side 1S and a secondary side 2S. The primary side 1S is connected to the battery 24, while the secondary side 2S is connected to the fuel cell 22 and the motor 26 (inverter 34).

(2) Fuel Cell 22

The fuel cell 22 has a stack structure formed by stacking a plurality of cells. Each cell includes an anode, a cathode, and a solid polymer electrolyte membrane interposed between the anode and the cathode. The fuel cell 22 is connected to a hydrogen tank 28 and an air compressor 30 via pipes. In the fuel cell 22, generated current If is generated by electrochemical reaction between a reactant gas, i.e. hydrogen (fuel gas) and air (oxygen-containing gas). The generated current If is supplied through a current sensor 32 and a diode (also called disconnecting diode) 33 to the inverter 34 and/or the DC/DC converter 36 of the VCU 23.

(3) Battery 24

The battery 24 connected to the primary side 1S may comprise a lithium ion secondary battery or a nickel-metal hydride secondary battery, a capacitor, or the like. In the first embodiment of the present invention, a lithium ion secondary battery is employed.

The battery 24 supplies auxiliary device current Iau to auxiliary devices 44 via a downverter 42. The battery 24 also supplies motor current Im to the inverter 34 through the DC/DC converter 36 of the VCU 23.

(4) Inverter 34 and Downverter 42

The inverter 34 converts direct current into alternating current to supply the motor current Im to the motor 26. The inverter 34 also converts the motor current Im from alternating current to direct current during a regenerative operation to supply the motor current Im from the secondary side 2S to the primary side 1S through the DC/DC converter 36.

Secondary voltage V2, which is either regenerative voltage or generated voltage Vf of the fuel cell 22, is converted into low primary voltage V1 by the DC/DC converter 36. The low primary voltage V1 is further converted into a lower voltage by the downverter 42 to be supplied as the auxiliary device current Iau to the auxiliary devices 44 such as an air conditioner, lamps, and the like. If there is any surplus current, the battery 24 is charged with the surplus current as battery current Ibat. The downverter 42 has a built-in current sensor.

(5) VCU 23

The VCU 23 is made up of the DC/DC converter 36 and a converter controller 54 for controlling the DC/DC converter 36.

The DC/DC converter 36 comprises three phase arms connected in parallel to each other between the battery 24 (first power device) and a second power device (the fuel cell 22 or the regenerative power supply (the inverter 34 and the motor 26)). The three phase arms include a U-phase arm UA (81u, 82u), a V-phase arm VA (81v, 82v), and a W-phase arm WA (81w, 82w). Each of the U-phase arm UA, V-phase arm VA, and W-phase arm WA includes an upper arm device 81 (81u, 81v, 81w) and a lower arm device 82 (82u, 82v, 82w), each arm device being a switching device such as an IGBT.

Diodes 83u, 83v, 83w, 84u, 84v, 84w are connected inversely across the respective arm devices 81u, 81v, 81w, 82u, 82v, 82w.

For ease of understanding, the upper arm devices 81 and lower arm devices 82 in the present invention do not comprise any antiparallel diodes 83, 84.

A single reactor 90 is disposed between the battery 24 and a common line connecting the midpoint of each phase arm (U-phase arm UA, V-phase arm VA, W-phase arm WA) of the three phase arms. This reactor 90 stores and releases energy during the voltage conversion between the primary voltage V1 and the secondary voltage V2 by the DC/DC converter 36.

The upper arm devices 81 (81u to 81w) are turned on by (the high level of) gate drive signals (driving voltage) UH, VH, WH, respectively, output from the converter controller 54, and the lower arm device 82 (82u to 82w) are turned on by (high-level) gate drive signals (driving voltages) UL, VL, WL, respectively, also output from the converter controller 54.

Each arm device 81u to 81w, 82u to 82w is provided with a temperature sensor 69. Each temperature sensor 69 and the gate terminal of each arm device 81u to 81w, 82u to 82w are connected to the converter controller 54.

Figure 7:
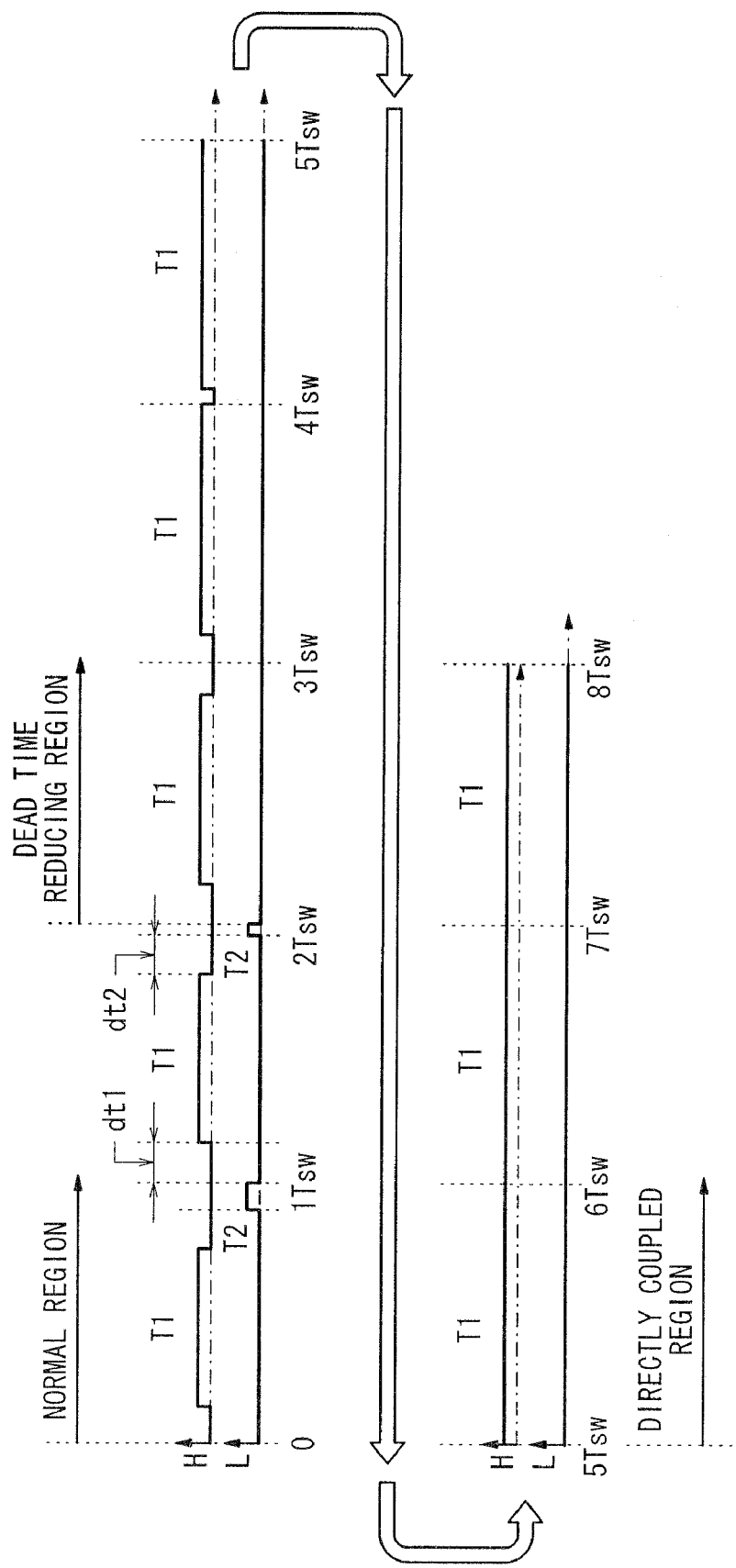
FIG. 7 is a schematic diagram illustrating a dead time reducing process according to the first embodiment.

The converter controller 54 includes a calculating unit 55 and an operation command unit 57. The calculating unit 55 calculates a connection period of the upper arm device 81 (also referred to as "upper arm device connection period T1") and a connection period of the lower arm device 82 (also referred to as "lower arm device connection period T2") in each switching cycle $T_{sw}$ [μs]. The calculating unit 55 also calculates two dead times dt that exist between the upper and lower arm device connection periods T1, T2. As shown in FIG. 7, one of the two dead times, referred to hereinafter as first dead time dt1, extends from the end of the lower arm device connection period T2 of the previous switching cycle $T_{sw}$ until the beginning of the upper arm device connection period T1 of the current switching cycle $T_{sw}$, while the other dead time, referred to hereinafter as second dead time dt2, extends from the end of the upper arm device connection period T1 of the current switching cycle $T_{sw}$ until the beginning of the lower arm device connection period T2 of the current switching cycle $T_{sw}$. Further, the upper arm device connection period T1, the lower arm device connection period T2, and the two dead times dt1, dt2, which are calculated by the calculating unit 55, will be collectively referred to as calculation results C. The calculating unit 55 transmits the calculation results C to the operation command unit 57.

Figure 12:
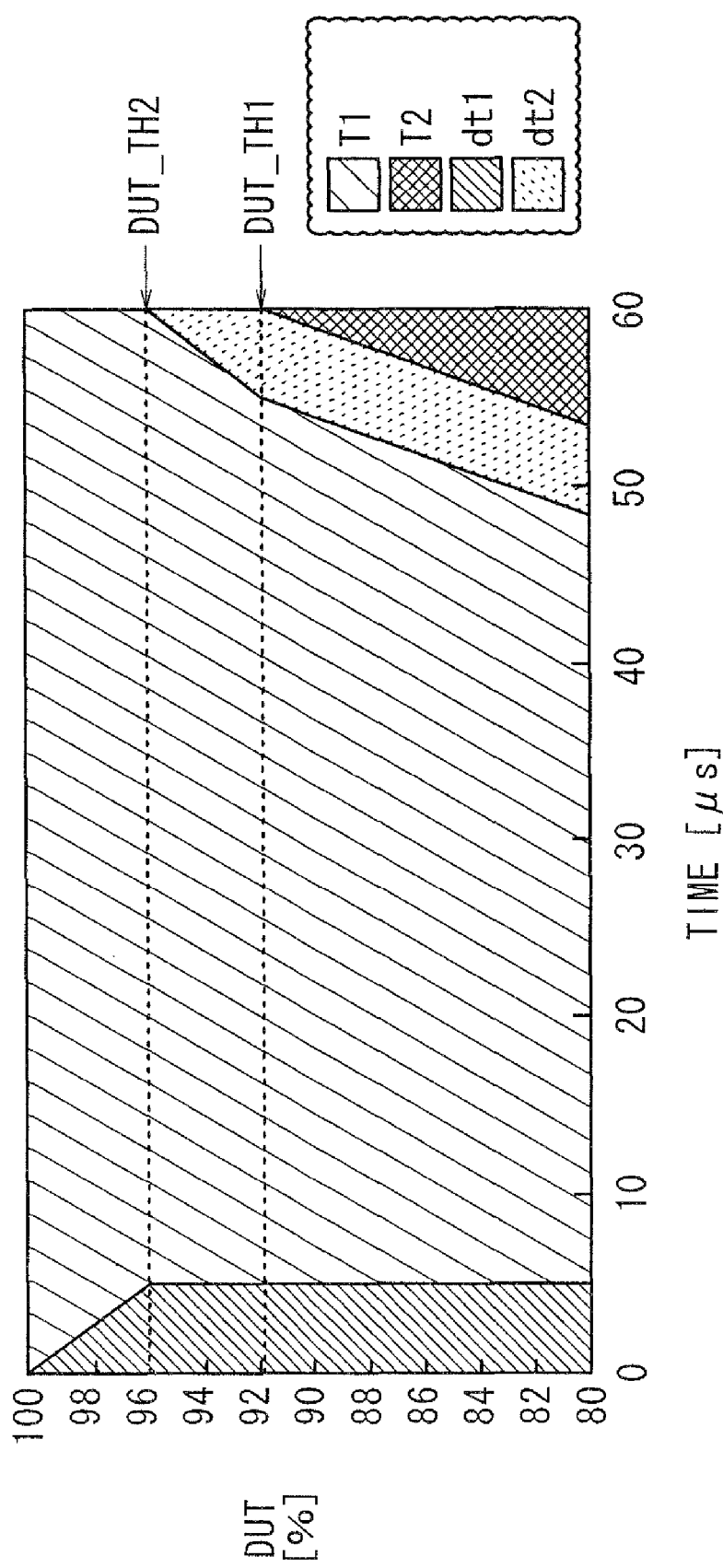
FIG. 12 is a diagram illustrating an output characteristic of a gate drive signal generated with the dead time reducing process according to the first embodiment.
Figure 13:
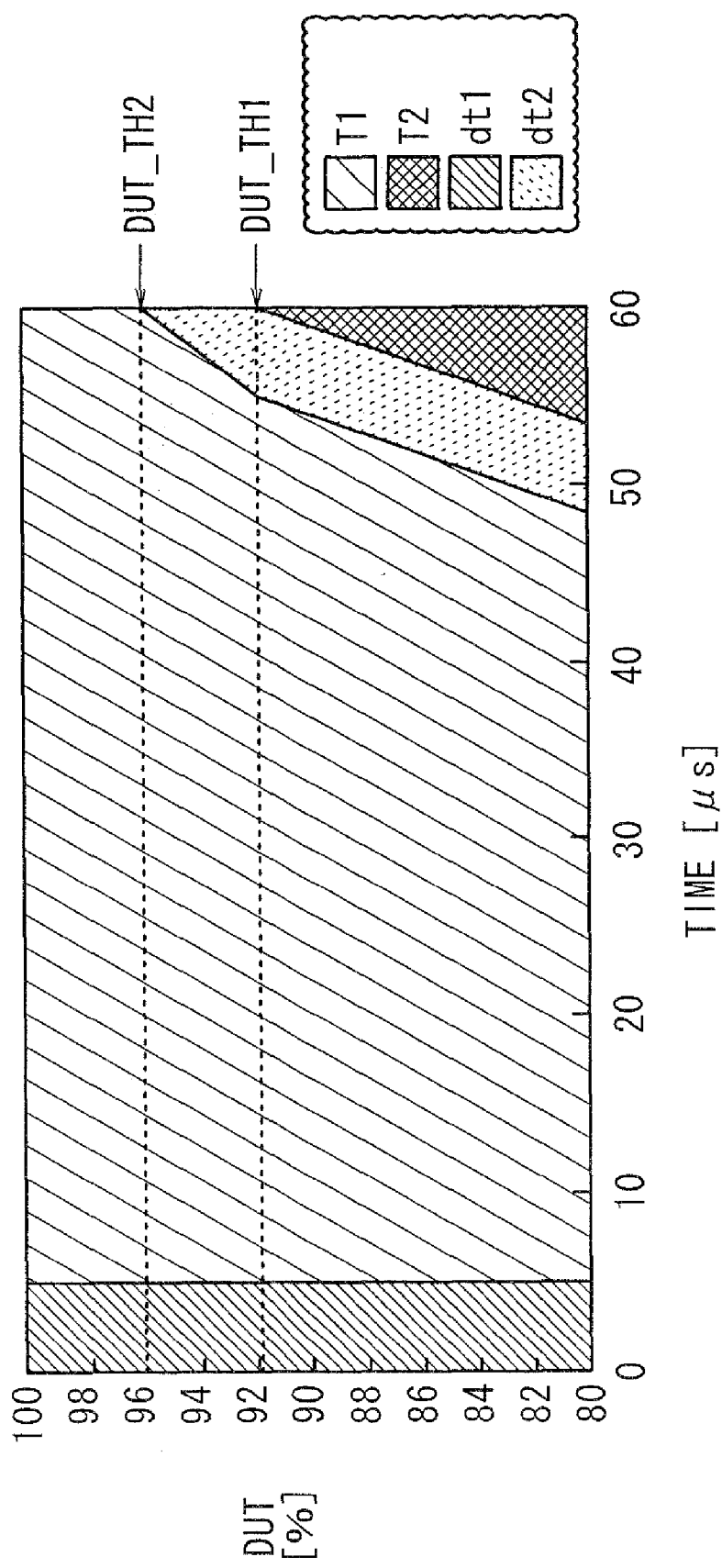
FIG. 13 is a diagram illustrating an output characteristic of a gate drive signal generated without the dead time reducing process according to the first embodiment.

The calculating unit 55 includes a table 71, three registers 72 (72u, 72v, 72w), and a permission judging unit 74. The table 71 holds the relationship between the duty ratio DUT [%] and the upper and lower arm device connection periods T1, T2 (FIGS. 12 and 13). The duty ratio DUT is the ratio of the upper arm device connection period T1 of the selected phase arm to the switching cycle $T_{sw}$. The duty ratio DUT is determined in accordance with a fuel cell allocated load Lf, which is the load to be borne by the fuel cell 22. The fuel cell allocated load Lf is calculated by a general controller 56, which will be described later. The functions of the three registers 72 and the permission judging unit 74 will also be described later.

The operation command unit 57 turns on/off the upper arm device 81u, 81v, 81w and the lower arm device 82u, 82v, 82w of each phase arm UA, VA, WA in accordance with the calculation results C received from the calculating unit 55. The operation command unit 57 includes three registers 76u, 76v, 76w, a switching cycle determining unit 78, and a timer 80. The three registers 76u, 76v, 76w are associated with the phase arms UA, VA, WA, respectively, and store the calculation results C for the corresponding phase arms UA, VA, WA. The switching cycle determining unit 78 determines the switching cycle $T_{sw}$ in accordance with the duty ratio DUT, reads the calculation results C from each register 76u, 76v, 76w one after another, and uses them to set the timer 80. The timer 80 outputs the drive signals UH, UL, VH, VL, WH, WL to the upper arm devices 81u, 81v, 81w and the lower arm devices 82u, 82v, 82w, in accordance with the calculation results C provided by the switching cycle determining unit 78, to turn these arm devices on and off.

(6) Capacitor 38, 39 and Resistor 40

The primary side 1S and the secondary side 2S are provided with smoothing capacitors 38, 39, respectively. The capacitor 39 provided to the secondary side 2S is connected in parallel with a resistor 40. The resistor 40 serves as a system load for the DC/DC converter 36 or the like.

(7) Controllers (FC Controller 50, Motor Controller 52, Converter Controller 54, General Controller 56)

A system including the fuel cell 22, the hydrogen tank 28, and the air compressor 30 is controlled by the FC controller 50. A system including the inverter 34 and the motor 26 is controlled by the motor controller 52, which includes an inverter driver (not shown). As mentioned above, the system including the DC/DC converter 36 is controlled by the converter controller 54.

The FC controller 50, the motor controller 52, and the converter controller 54 are controlled by the general controller 56, which serves as a higher level controller that determines the value of a total load requirement Lt of the fuel cell 22, and the like.

The general controller 56 adjusts and determines the total load requirement Lt on the fuel cell vehicle 20 based on the states of the fuel cell 22, battery 24, motor 26, and auxiliary devices 44, as well as inputs from various switches and sensors (load requirements), and determines the allocation of the total load requirement Lt among the fuel cell allocated load (required output) Lf to be borne by fuel cell 22, a battery allocated load (required output) Lb to be borne by the battery 24, and a regenerative power supply allocated load Lr to be borne by the regenerative power supply. The general controller 56 also sends commands to the FC controller 50, motor controller 52, and converter controller 54.

Each of the general controller 56, the FC controller 50, the motor controller 52, and the converter controller 54 includes, in addition to a CPU, a ROM, a RAM, and a timer, input-output interfaces such as an analog-to-digital (A/D) converter and a digital-to-analog (D/A) converter, and also, if necessary, a digital signal processor (DSP) or the like.

The general controller 56, the FC controller 50, the motor controller 52, and the converter controller 54 are connected to each other by communication lines 70, which serve to define a CAN (Controller Area Network) as an intravehicular LAN, and perform various functions by sharing input and output information from various switches and various sensors, and by executing programs stored in ROMs under the control of CPUs based on the input and output information from the various switches and various sensors.

(8) Switches and Sensors

Switches and sensors for detecting vehicle states include, in addition to the current sensor 32 for detecting the generated current If, a voltage sensor 61 for detecting the primary voltage V1 (basically the same as the battery voltage Vbat), a current sensor 62 for detecting the primary current I1, a voltage sensor 63 for detecting the secondary voltage V2 (substantially the same as the generated voltage Vf of the fuel cell 22 when the disconnecting diode 33 is in a conduction state), a current sensor 64 for detecting the secondary current I2, an ignition switch 65, an accelerator sensor 66, a brake sensor 67, a vehicle speed sensor 68, a temperature sensor 69 connected to the converter controller 54, and the like, each of which are connected to the communication lines 70.

2. Controls (1) Voltage Control

The primary voltage V1 is basically the same as the battery voltage Vbat, which is the open circuit voltage (OCV) of the battery 24 when no load is connected thereto.

Figure 2:
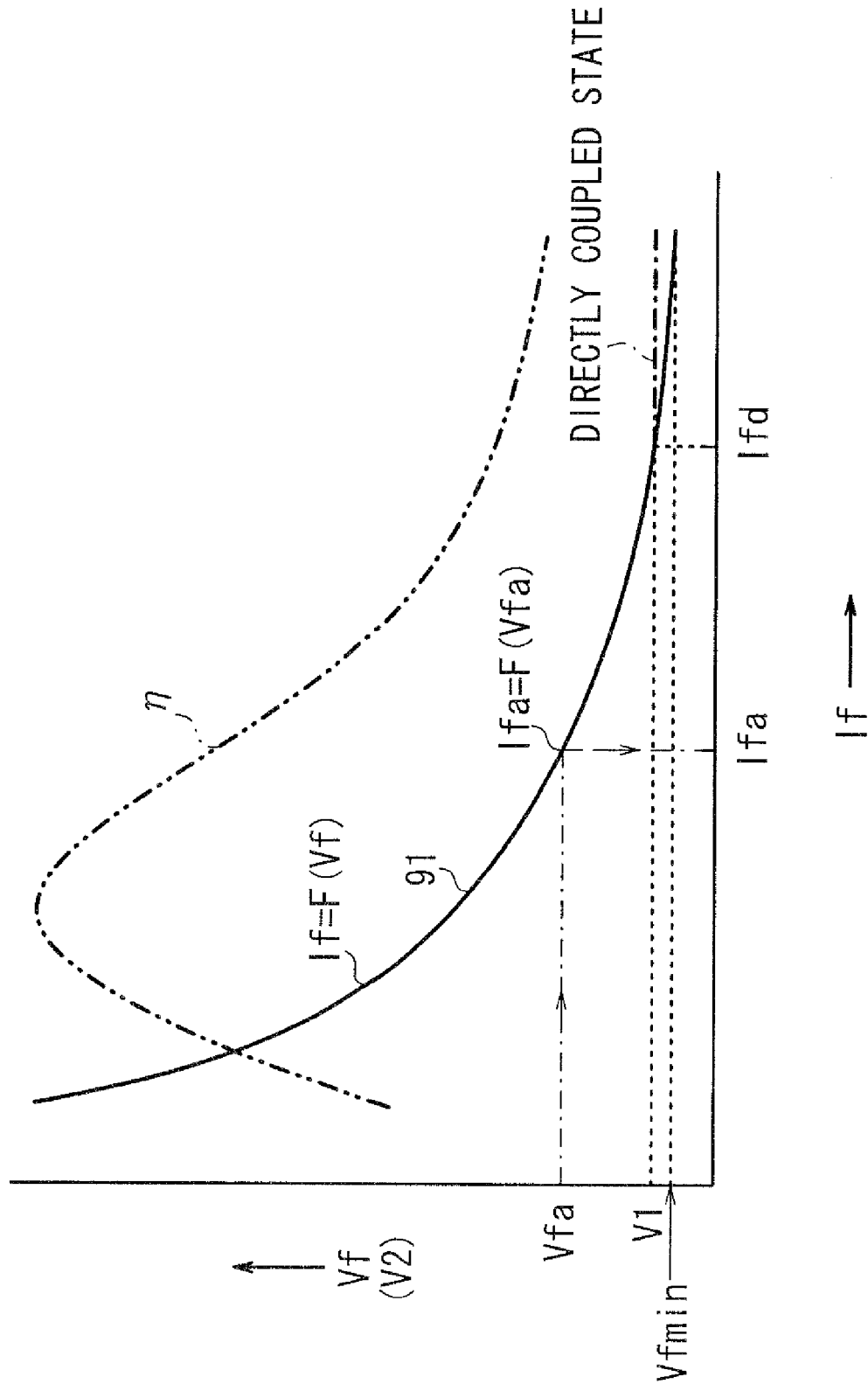
FIG. 2 is a diagram illustrating current-voltage characteristics of a fuel cell.

When the fuel cell 22 is generating power, the secondary voltage V2 is equal to the power generation voltage Vf of the fuel cell 22. The primary voltage V1, which is typically the open circuit voltage OCV of the battery 24 at a time when no load is connected to the battery 24, is set to a higher voltage than the minimum voltage Vfmin of the generated voltage Vf of the fuel cell 22 as shown in the fuel cell output characteristic curve (current-voltage characteristic curve) 91 of FIG. 2. In FIG. 2, OCV≈V1.

When the generated voltage Vf of the fuel cell 22 becomes equal to the voltage Vbat (=V1) of the battery 24, the fuel cell 22 and the battery 24 are brought into a directly coupled state as represented in FIG. 2 by the dash-dotted heavy line. In the directly coupled state, the diodes 83u to 83w are in a conducting state, and, for example, most of the current higher than the current Ifd (see FIG. 2) at establishment of the directly coupled state with respect to the fuel cell 22 is covered with the battery current Ibat from the battery 24. Also, even in the case that the generated current If is lower than the current Ifd at the establishment of the directly coupled state, the battery current Ibat from the battery 24 is converted into the secondary current I2 by the DC/DC converter 36 in view of the power generation efficiency η of the fuel cell 22 represented by the chain double-dashed line, and the secondary current I2 is added to the generated current If, and then supplied to the motor 26 as the motor current Im.

In the above directly coupled state (referred to as "directly coupled state for high output power" or "first directly coupled state"), where the secondary current I2 is supplied (in other words, sourced) from the secondary side 2S of the DC/DC converter 36 to the inverter 34 in order to produce high output power, the secondary voltage V2 is controlled to V2=V1−Vd (Vd is a forward voltage drop across the diodes 83u, 83v, 83w).

During a halt of the fuel cell vehicle 20, another directly coupled state occurs. When the fuel cell vehicle 20 is halted (waiting for a traffic light to change, or the like), the operation of the air compressor 30 and also the supply of the fuel gas from the hydrogen tank 28 is stopped in order to save fuel. In this case, the power generation voltage Vf (or the generated current If) of the fuel cell 22 is discharged through the resistor 40 or the like and supplied to the auxiliary devices 44 such as an air conditioner, and drops to zero when the fuel gas in the fuel cell 22 is used up. The supply of the auxiliary current Iau to the auxiliary devices 44, however, is maintained by the battery 24.

When returning the fuel cell 22 to its power generation state by releasing the brake pedal and operating the acceleration pedal while a halt of the fuel cell vehicle 20 (a so-called idling stop), the voltage of the secondary side 2S at the DC/DC converter 36 is maintained at that of the directly coupled state in order to allow the VCU 23 to smoothly restart the control of the output of the fuel cell 22. More specifically, in this directly coupled state (referred to as idling stop directly coupled state or second direct couple state), the load is the resistor 40, and the voltage V2 at the secondary side 2S of the DC/DC converter 36 is kept at V2=V1−Vd.

(2) Output Control of Fuel Cell 22

Now, the output control of the fuel cell 22 by means of the VCU 23 will be described below.

Fuel gas and compressed air are supplied from the hydrogen tank 28 and the air compressor 30, respectively, to the fuel cell 22 to generate power. During power generation, the generated current If of the fuel cell 22 is determined by the converter controller 54 that sets the secondary voltage V2, i.e. the power generating voltage Vf, on the characteristic curve 91 (also called function F(Vf)) shown in FIG. 2 through the DC/DC converter 36. In other words, the generated current If value is determined as the function F(Vf) of the generated voltage Vf. Since If=F(Vf), if the power generation voltage Vf is set to Vf=Vfa=V2, the generated current Ifa is given by Ifa=F(Vfa)=F(V2).

Since the generated current If of the fuel cell 22 is determined by determining the secondary voltage V2 (the power generation voltage Vf), the operation of the fuel cell vehicle 20 can be controlled by setting the secondary voltage V2 (power generation voltage Vf) to a target voltage (target value).

In a system including the fuel cell 22 such as the fuel cell vehicle 20, the VCU 23 is controlled so that the secondary voltage V2 at the secondary side 2S of the DC/DC converter 36 becomes the target voltage, and consequently the VCU 23 controls the output of the fuel cell 22 (the generated current If).

The mode of the DC/DC converter 36 in which the output of the fuel cell 22 is controlled in the manner described above will be referred to as a fuel cell output control mode.

(3) Operation Control of DC/DC Converter (a) Basic Operation

Figure 3:
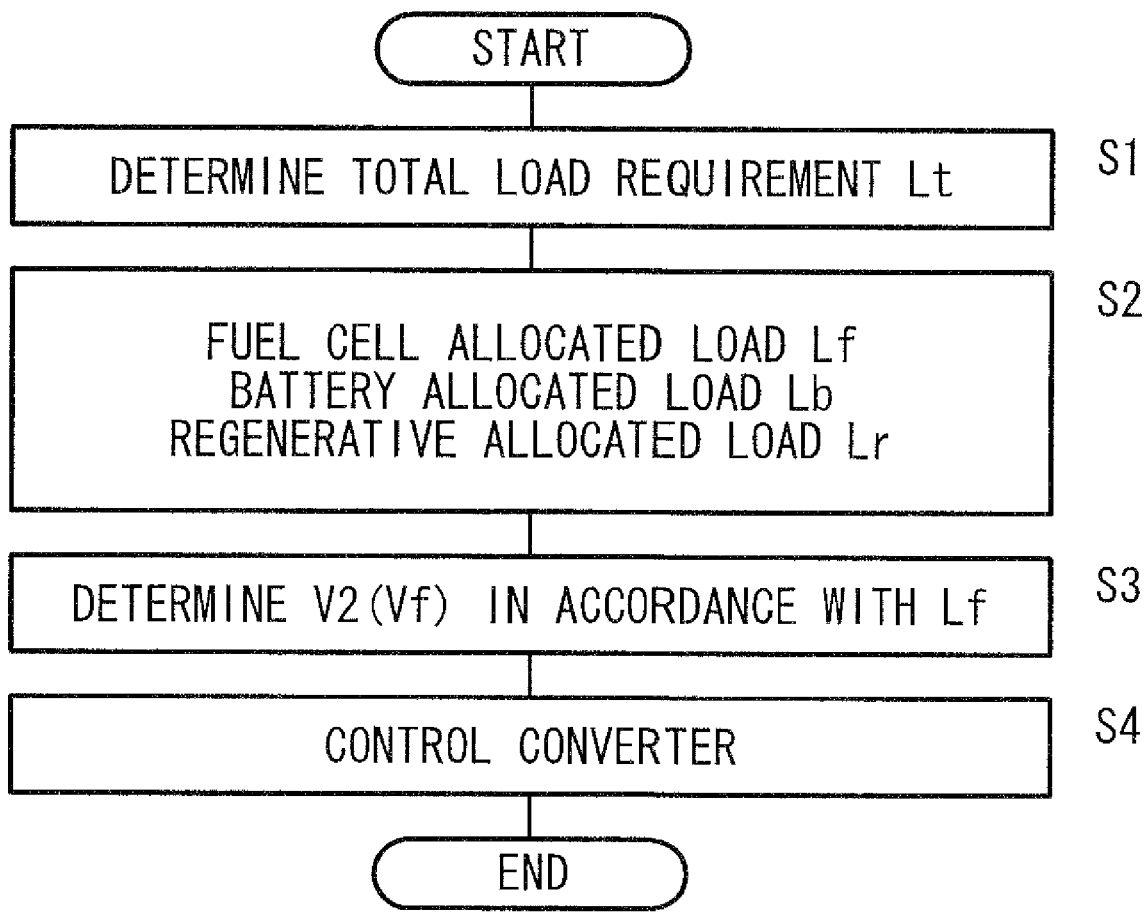
FIG. 3 is a flow chart illustrating the basic control of a DC/DC converter incorporated in the fuel cell vehicle.

Next, basic operation of the DC/DC converter 36 that is driven and controlled by the converter controller 54 will be described below with reference to the flow chart shown in FIG. 3.

As described above, the general controller 56 determines the total load requirement Lt of the fuel cell vehicle 20 based on the states of the fuel cell 22, battery 24, motor 26, and auxiliary devices 44, as well as the inputs from various switches and sensors (load requirements), and then adjusts and determines the allocation of the total load requirement Lt of the fuel cell vehicle 20 among the fuel cell allocated load (required output) Lf to be borne by the fuel cell 22, a battery allocated load (required output) Lb to be borne by the battery 24, and a regenerative power supply allocated load Lr to be borne by the regenerative power supply, and sends commands to the FC controller 50, motor controller 52, and converter controller 54.

In step S1, the general controller 56 determines (calculates) the total load requirement Lt from the power requirement of the motor 26, the power requirement of the auxiliary devices 44, and the power requirement of the air compressor 30, all of which represent load requirements. In step S2, the general controller 56 determines the allocation of the total load requirement Lt among the fuel cell allocated load Lf, the battery allocated load Lb, and the regenerative power supply allocated load Lr. When the fuel cell allocated load Lf is determined, the efficiency η of the fuel cell 22 is taken into account.

Then, in step S3, the converter controller 54 determines the generated voltage Vf of the fuel cell 22, which is the secondary voltage V2 in the present case, in accordance with the fuel cell allocated load Lf.

Once the secondary voltage V2 has been determined, the converter controller 54 drives and operates, in step S4, the DC/DC converter 36 so that the determined secondary voltage V2 can be obtained. Then, the DC/DC converter 36 performs a voltage-increasing or voltage-reducing (decreasing) operation.

In the voltage increasing operation for sourcing the secondary current I2 from the secondary side 2S of the DC/DC converter 36 to the inverter 34, in step S4, the converter controller 54 controls the DC/DC converter 36 in a rotation switching process by turning on the lower arm device 82$u$ (thus storing energy in the reactor 90 with the primary current I1 produced by subtracting the auxiliary current Iau from the battery current Ibat, and at the same time sourcing the secondary current I2 from the capacitor 39 to the inverter 34), then rendering the diodes 83$u$, 83$v$, 83$w$ conductive (discharging energy from the reactor 90, storing the energy in the capacitor 39, and sourcing the secondary current I2 to the inverter 34), thereafter turning on the lower arm device 82$v$, then rendering the diodes 83$u$, 83$v$, 83$w$ conductive, then turning on the lower arm device 82$w$, then rendering the diodes 83$u$, 83$v$, 83$w$ conductive, thereafter turning on the lower arm device 82$u$, and so on.

The upper arm device connection period T1 (the period of time for which the upper arm devices 81$u$ to 81$w$ are connected) and the lower arm device connection period T2 (the period of time for which the lower arm devices 82$u$ to 82$w$ are connected) are determined such that the output voltage is kept at the level V2.

Further, in the directly coupled operation for high output power wherein the second current I2 is sourced from the secondary side 2S of the DC/DC converter 36 to the inverter 34 in step S4, the diodes 83$u$ to 83$w$ are activated so that the secondary voltage V2 becomes V2=V1−Vd. As will be described later, in the present embodiment, a synchronous switching process is performed that alternately switches between ON of the upper arm devices 81$u$ to 81$w$ and ON of the lower arm devices 82$u$ to 82$w$ in each switching cycle $T_{sw}$. In the high power directly coupled operation, however, the lower arm devices 82$u$ to 82$w$ are not turned on, and only the upper arm devices 81$u$ to 81$w$ are kept ON.

In the voltage reducing operation for supplying (in other words, sinking current on the secondary side 2S) the secondary current I2 from the secondary side 2S of the DC/DC converter 36 to the auxiliary devices 44 and the battery 24 at the primary side 1S, in step S4, the converter controller 54 controls the DC/DC converter 36 in a rotation switching process by turning on the upper arm device 81$u$ (thus storing energy in the reactor 90 with the secondary current I2 output from the capacitor 39, and at the same time supplying the primary current I1 from the capacitor 38 to the auxiliary devices 44 and, if necessary, the battery 24), then rendering the diodes 84$u$, 84$v$, 84$w$ conductive (operating as flywheel diodes, discharging the energy from the reactor 90, storing the energy in the capacitor 38, and supplying the primary current I1 to the auxiliary devices 44 and, if necessary, the battery 24), thereafter turning on the upper arm device 81$v$, then rendering the diodes 84$u$, 84$v$, 84$w$ conductive, then turning on the upper arm device 81$w$, then rendering the diodes 84$u$, 84$v$, 84$w$ conductive, thereafter turning on the upper arm device 81$u$, and so on.

If there is regenerative power, the regenerative power supply allocated load Lr is added to the sinking secondary current during the voltage-reducing operation. Further, the ON duty ratios of the upper arm devices 81$u$ to 81$w$ and the lower arm devices 82$u$ to 82$w$ are determined to keep the output voltage at V2.

In the first embodiment, the converter controller 54 typically determines the next cycle (i.e., next $3 \times T_{sw}$) operation of the DC/DC converter 36 (the control operation of the converter in step S4), at every processing cycle which is three times the switching cycle $T_{SW}$. The switching cycle $T_{SW}$ is the reciprocal of the switching frequency $F_{sw}$ (and may be of the order $^{1}/_{10}$ kHz, for example).

The general controller 56 determines the total load requirement Lt (step S1), the allocation of the total load requirement Lt among the fuel cell allocated load Lf, the battery allocated load Lb, and the regenerative power supply allocated load Lr (step S2), and sends commands to the FC controller 50, the converter controller 54, and the motor controller 52. The results of the control are provided in sequence from the FC controller 50, the converter controller 54, and the motor controller 52 to the general controller 56.

The secondary voltage V2 and the primary voltage V1 are controlled by the converter controller 54 that operates the DC/DC converter 36 based on PID control that is a combination of feedforward control and feedback control.

(b) Rotation Switching of VCU 23

Next, operation of the rotation switching of the VCU 23, which includes the DC/DC converter 36, will be described in detail. In the first embodiment, the rotation switching utilizes PWM (Pulse Width Modulation) control. As will be described later, PFM (Pulse Frequency Modulation) control may be utilized in addition to the PWM control, or alternatively, the PFM control may be used alone.

Figure 4:
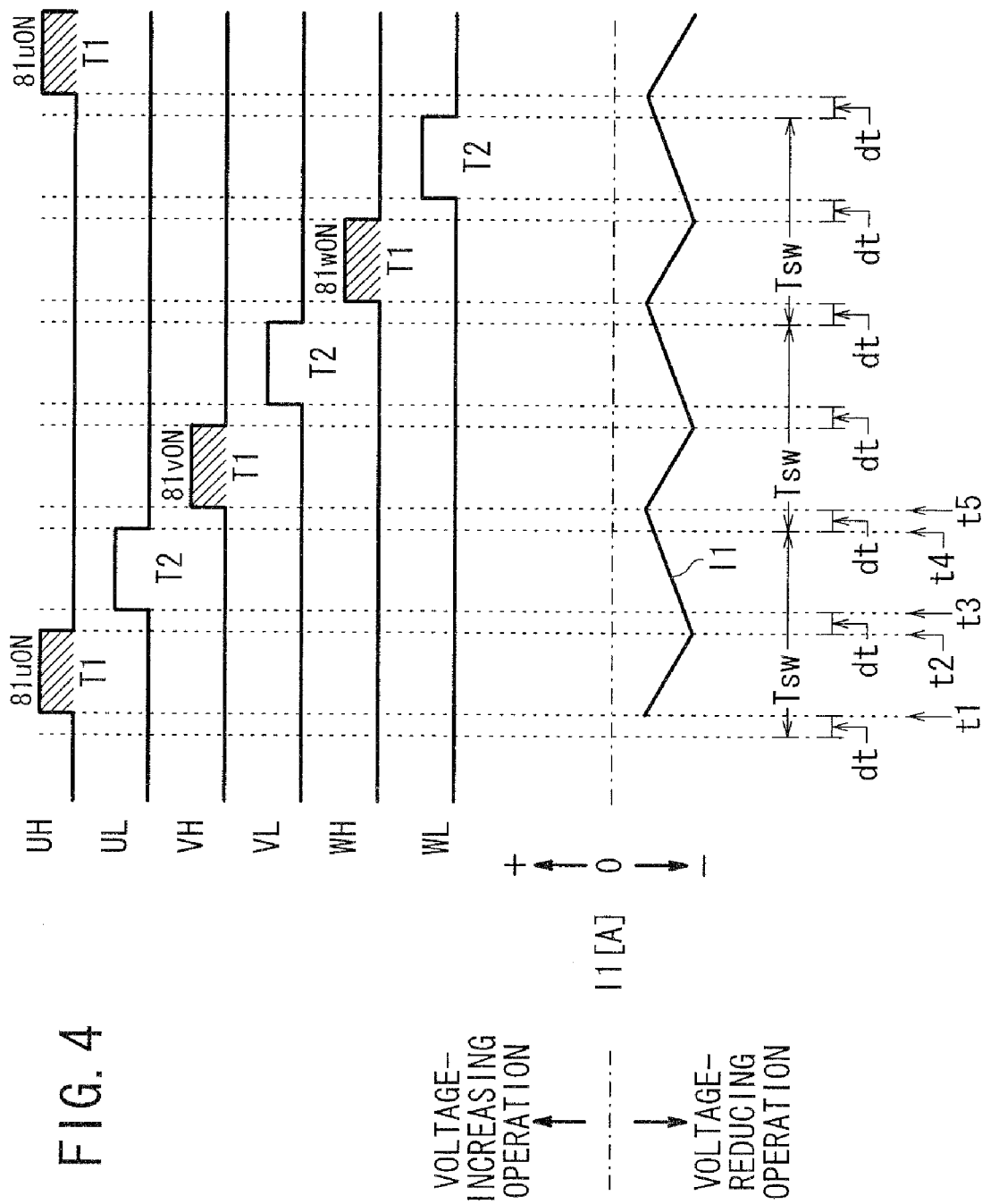
FIG. 4 is a timing chart illustrating a voltage-reducing operation of the DC/DC converter.
Figure 5:
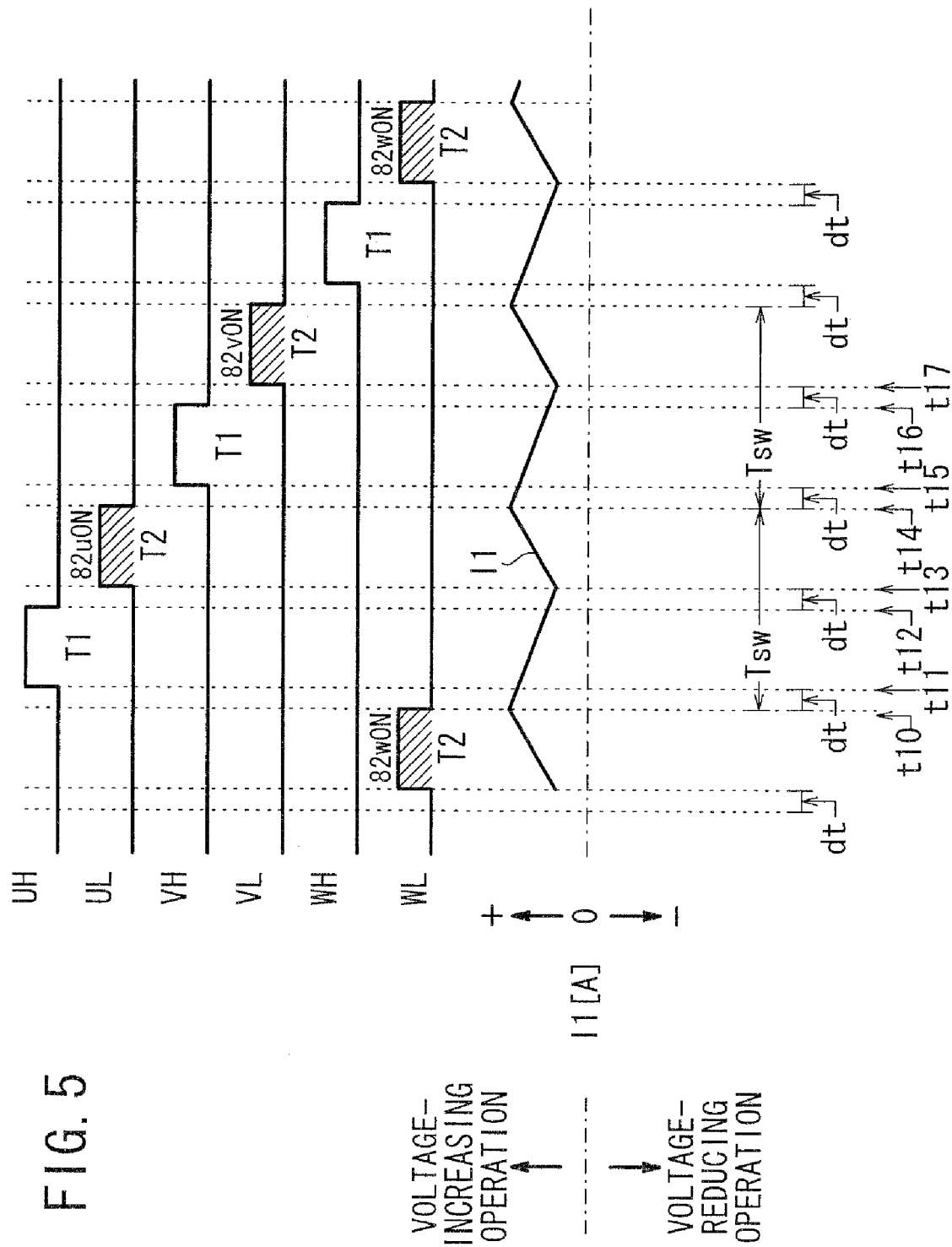
FIG. 5 is a timing chart illustrating a voltage-increasing operation of the DC/DC converter.

FIG. 4 illustrates a timing chart of the voltage-reducing operation of the VCU 23 under the PWM control (i.e. the second current I2 is sink current), and FIG. 5 illustrates a timing chart of the voltage-increasing operation performed by the VCU 23 under the PWM control (i.e. the second current I2 is source current).

In FIGS. 4 and 5, the primary current I1 has a positive (+) sign when the primary current I1 flows from the primary side 1S to the secondary side 2S in the voltage increasing operation (wherein source current flows from the secondary side 2S of the DC/DC converter 36 to the inverter 34). The primary current I1 has a negative sign (−) when the primary current I1 flows from the secondary side 2S to the primary side 1S in the voltage reducing operation (wherein sink current flows from the fuel cell 22 or the inverter 34 to the secondary side 2S of the DC/DC converter 36).

In FIGS. 4 and 5, the drive signals UH, UL, VH, VL, WH, WL output from the converter controller 54 include hatched areas in their waveforms that represent the periods during which the arm devices supplied with the drive signals UH, UL, VH, VL, WH, WL (for example, the arm device corresponding to the drive signal UH is the upper arm device 81u) are actually turned on (i.e., current is flowing through the arm devices). In other words, even when the drive signals UH, UL, VH, VL, WH, WL are being supplied, if the diodes 83u to 83w, 84u to 84w connected in parallel are not OFF, the corresponding arm devices are not in conduction state.

As shown in FIGS. 4 and 5, in both of the voltage reducing mode and the voltage increasing mode of the DC/DC converter 36, as can be understood from the waveforms of the drive signals UH, UL, VH, VL, WH, WL output from the converter controller 54, the U-, V-, W-phase arms UA, VA, WA are alternately turned on by turning on the drive signals UH, UL, VH, VL, WH, WL at the switching cycle $T_{SW}$ (rotation switching process). When the U-, V-, W-phase arms UA, VA, WA are turned on, the upper arm devices 81u, 81v, 81w of the U-, V-, W-phase arms UA, VA, WA are turned on by the drive signals UH, VH, WH (see FIG. 4), or the lower arm devices 82u, 82v, 82w of the U-, V-, W-phase arms UA, VA, WA are turned on by the drive signals UL, VL, WL (see FIG. 5).

As can be seen from FIGS. 4 and 5 and also from FIG. 6, which will be described later, in order to prevent a short circuit of the voltage V2 due to simultaneously turning on both upper and lower arm devices 81, 82, dead times dt are provided between the drive signals for turning on the upper arm devices 81u to 81w and the drive signals for turning on the lower arm devices 82u to 82w. In other words, a dead time dt is provided between the drive signals UH and UL, between the drive signals VH and VL, and between the drive signals WH and WL. In addition, when turning on the phase arms UA to WA of the multi-phase arms in rotation, a dead time dt is provided between the drive signals UL and VH, between the drive signals VL and WH, and between the drive signals WL and UH. In other words, the so-called synchronous switching is performed with dead times interposed.

In FIG. 4, which shows the operation of the voltage-reducing process, the upper arm device 81u, for example, is turned on by the drive signal UH between time t1 and time t2 (upper arm device connection period T1). During the upper arm device connection period T1, the secondary current I2 generated by the fuel cell 22 and/or the regenerative power supply is stored as energy in the reactor 90 through the upper arm device 81u. During the time period from t2 to t5 that includes a first dead time dt, an ON time of the drive signal UL (but no current flow through the lower arm device 82u), and a second dead time dt, the energy stored in the reactor 90 is discharged as the primary current I1 to the primary side 1S through the diodes 84u to 84w that are ON and serve as freewheel diodes. After time t5, the upper arm devices 81v, 81w, 81u are turned on in rotation to repeat the same operation continuously.

In FIG. 5, which illustrates the operation of the voltage-increasing process, the lower arm device 82u, for example, is turned on by the drive signal UL between time t13 and time t14 (lower arm device connection period T2). During this lower arm device connection period T2, the reactor 90 is charged by the primary current I1 from the battery 24. During the time period from t14 to t17 that includes a first dead time dt, an ON time of the drive signal VH (but no current flows through the upper arm device 81v), and a second dead time dt, the energy stored in the reactor 90 is discharged to the secondary side 2S through the diodes 83u to 83w that are activated to serve as rectifier diodes and are turned on. After time t17, the lower arm devices 82v, 82w, 82u are turned on in rotation to repeat the same operation continuously.

Figure 6:
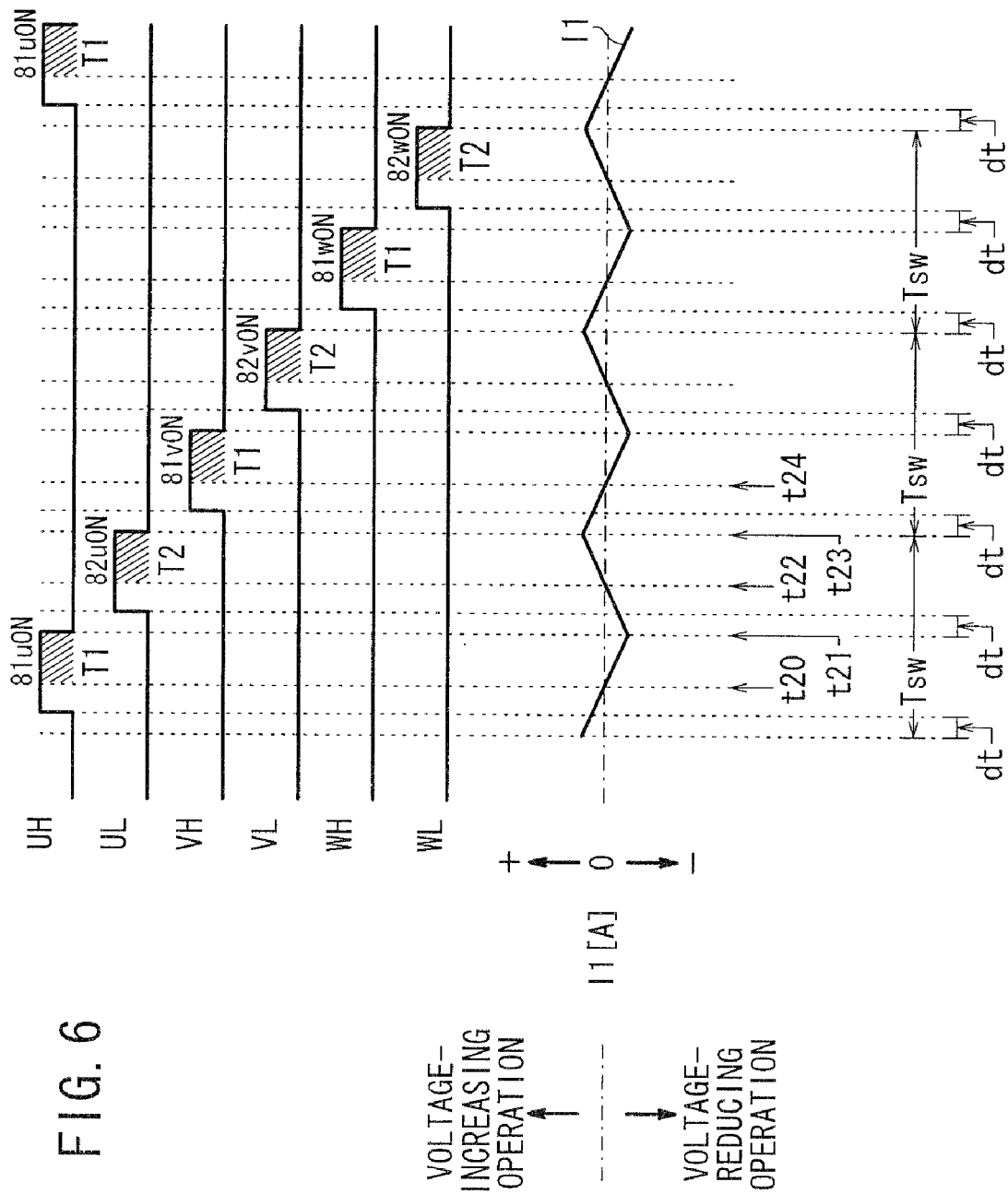
FIG. 6 is a timing chart illustrating a transition between the voltage-increasing and voltage-reducing operations of the DC/DC converter.

In FIG. 6, which shows the transition between the voltage-increasing operation and the voltage-reducing operation, the upper arm device 81u, for example, is turned on by the drive signal UH between time t20 and time t21 (period indicated by hatching). During this period, energy is stored into the reactor 90 with the secondary current I2 from the fuel cell 22 and/or the regenerative power supply through the upper arm device 81u.

In the period from time t21 to time t22 at which the direction of the current reverses (the sign changes from minus to plus), the energy stored in the reactor 90 is discharged to the primary side 1S through the diodes 84u to 84w that are ON and serve as freewheel diodes.

In the period from time t22 to time t23, the lower arm device 82u is turned on by the drive signal UL, and the reactor 90 is charged by the primary current I1 from the battery 24. In the period from time t23 to time t24 at which the direction of the current reverses (i.e. the sign changes from plus to minus), the energy stored in the reactor 90 is released to the secondary side 2S through the diodes 83u to 83w that have turned on. The operation described above is then repeated continuously in the same manner. Thus, in the three-phase rotation switching according to the present embodiment, smooth transition is achieved between the voltage-increasing operation and the voltage-reducing operation.

(c) Direct Couple Shifting Process

Next, a synchronous switching process that allows for the shift to the directly coupled state (see the dash-dotted heavy line in FIG. 2), i.e. the detail of step S4 in FIG. 3, will be described. Note that this synchronous switching process will be referred to hereinafter as "direct couple shifting process".

As described above, the first embodiment employs synchronous switching. In the present synchronous switching, an upper arm device connection period T1, a lower arm device connection period T2, a first dead time dt1, and a second dead time dt2 are determined for each switching cycle $T_{sw}$. The upper arm device connection period T1 is the time period for which the drive signal UH, VH, WH for the upper arm device 81u to 81w is high and the upper arm device 81u to 81w is turned on, and the lower arm device connection period T2 is the time period for which the drive signal UL, VL, WL for the lower arm device 82u to 82w is high and the lower arm device 82u to 82w is turned on. The first dead time dt1 is the dead time dt extending from the end of the lower arm device connection period T2 in the previous switching cycle $T_{sw}$ to the beginning of the upper arm device connection period T1 in the current switching cycle $T_{sw}$, and the second dead time dt2 is the dead time dt extending from the end of the upper arm device connection period T1 in the present switching cycle $T_{sw}$ to the beginning of the lower arm device connection period T2 in the current switching cycle $T_{sw}$.

FIG. 7 schematically illustrates a dead time reducing process according to the first embodiment (the detail will be described later). In FIG. 7, the first and second switching cycles $T_{sw}$ are a normal region where the first dead time dt1 and the second dead time dt2 have a constant length (a standard time period dtr). The third to fifth switching cycles $T_{sw}$ have no lower arm device connection period T2 and thus are a dead time reducing region where the first dead time dt1 and the second dead time dt2 are reduced. The sixth to eighth switching cycles $T_{sw}$ are a direct coupling region that includes none of the lower arm device connection period T2, first dead time dt1, or second dead time dt2, and, hence, is entirely occupied by the upper arm device connection period T1.

It should be noted that distinctions among the phase arms UA, VA, WA are not made in FIG. 7. It should be also noted that the present embodiment employs the PWM control. Thus, the length of each switching cycle $T_{sw}$ is constant.

Figure 8:
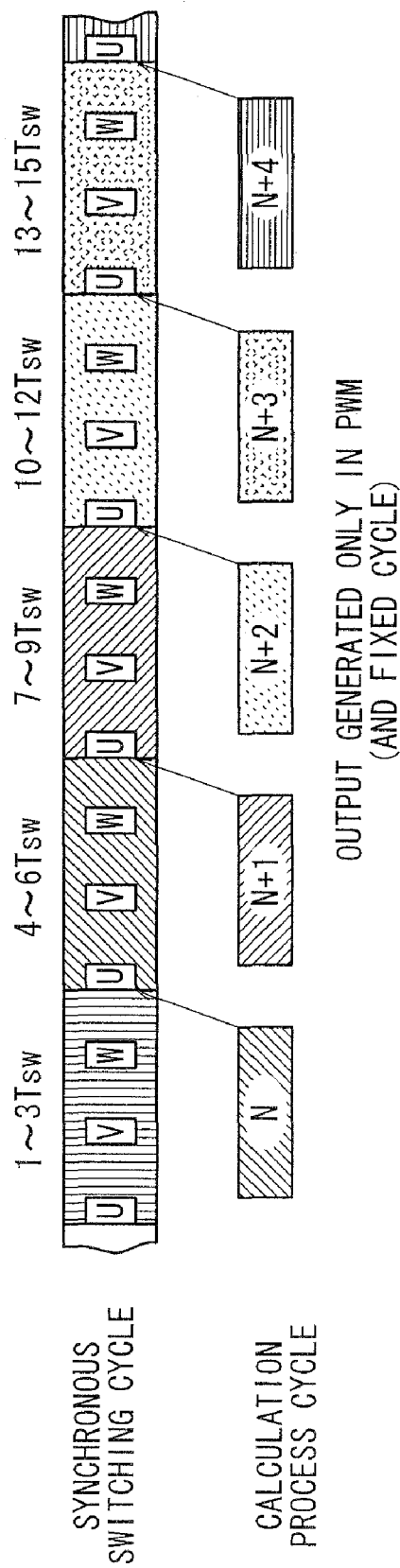
FIG. 8 is a schematic diagram illustrating a relationship between a synchronous switching cycle and a calculation process cycle according to the first embodiment.

FIG. 8 shows the timing in the first embodiment for calculating the upper arm device connection period T1, lower arm device connection period T2, first dead time dt1, and second dead time dt2 for each phase arm UA, VA, WA and performing the synchronous switching of the phase arms UA, VA, WA using the calculation results C.

As shown in FIG. 8, the calculating unit 55 (see FIG. 1) of the converter controller 54 performs the calculations for all three arm phases UA, VA, WA collectively (see also FIG. 1). More specifically, the Nth calculation process in FIG. 8, which is for the fourth to sixth switching cycles $T_{sw}$, is made during the first to third switching cycles $T_{sw}$. Further, the N+1th calculation process for the seventh to ninth switching cycles $T_{SW}$ is made during the fourth to sixth switching cycles $T_{SW}$.

Figure 9:
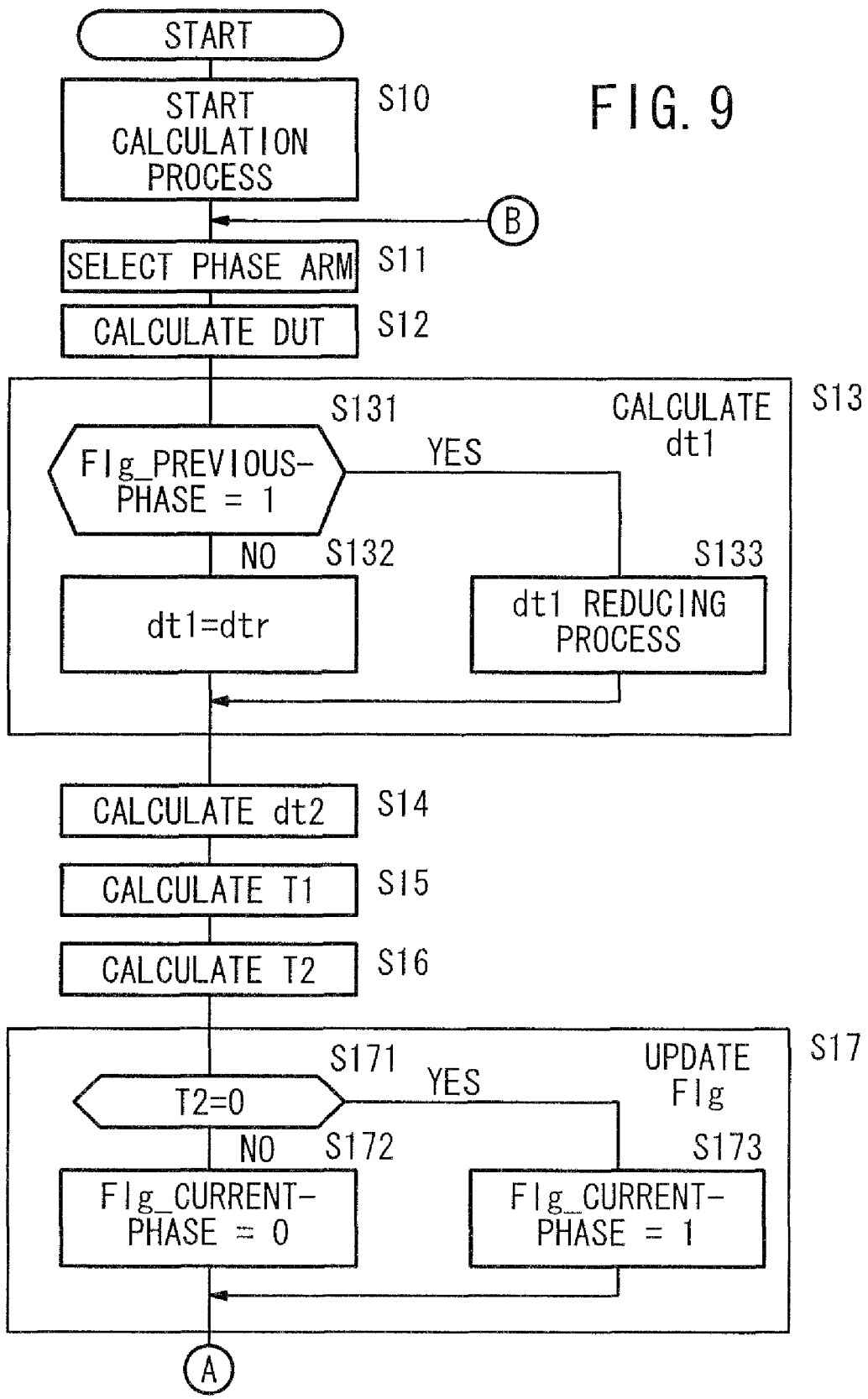
FIG. 9 is a first flow chart illustrating a process executed by a converter controller according to the first embodiment.
Figure 10:
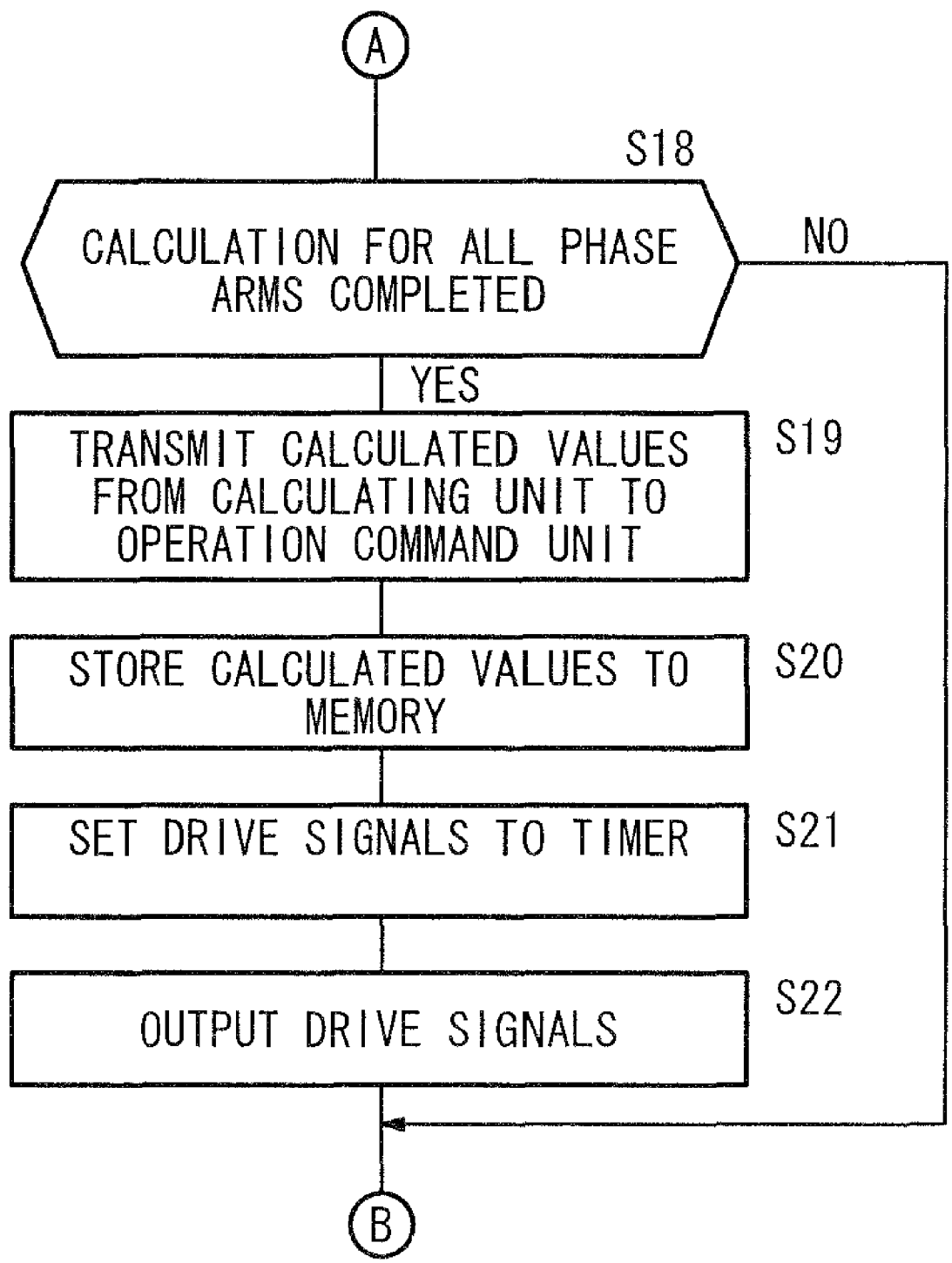
FIG. 10 is a second flow chart illustrating a process executed by a converter controller according to the first embodiment.
Figure 11:
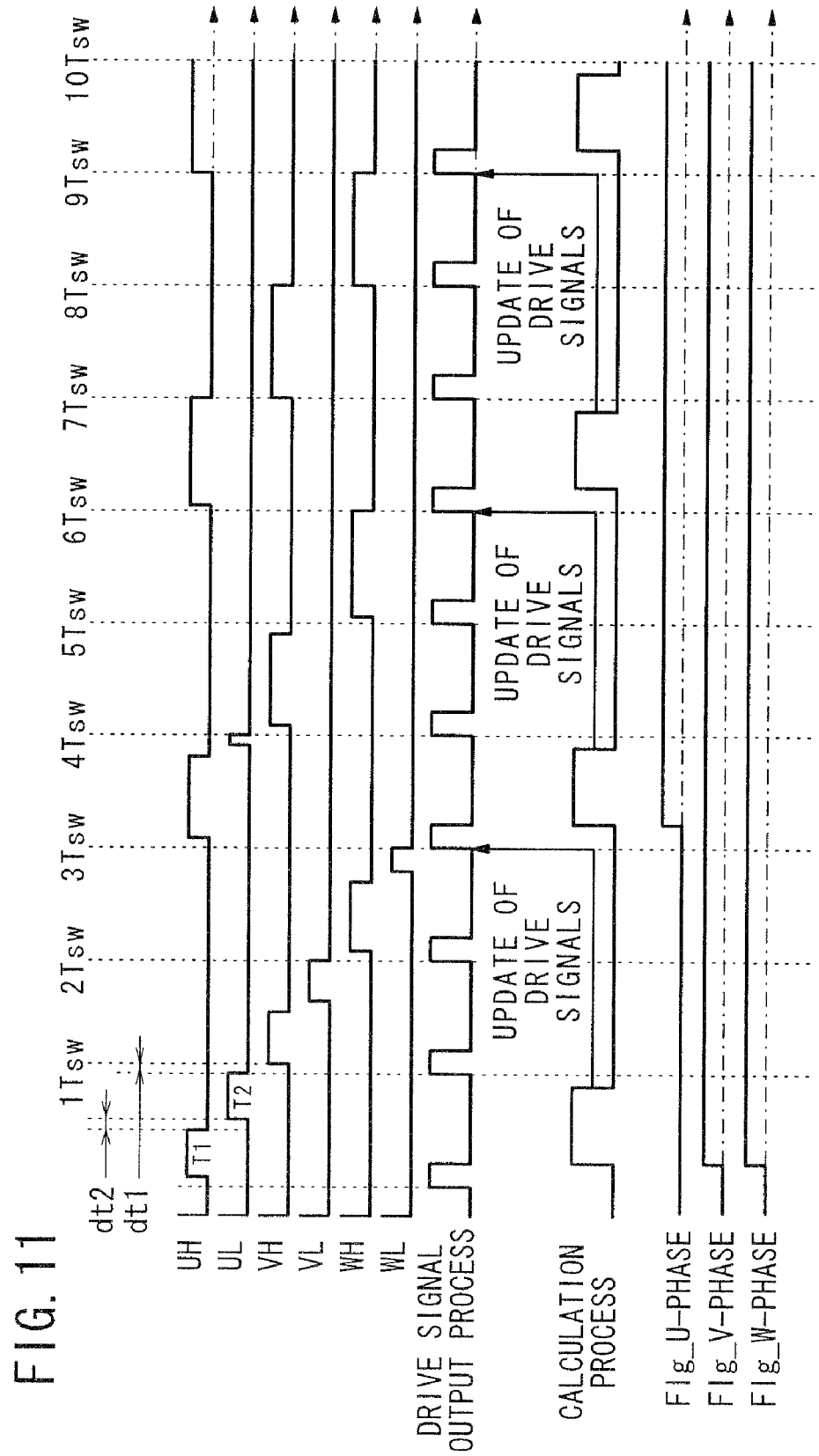
FIG. 11 is a timing chart of various signals according to the first embodiment.

FIGS. 9 and 10 show a flow chart for calculating the upper arm device connection period T1, lower arm device connection period T2, first dead time dt1, and second dead time dt2. FIG. 11 shows an exemplary timing chart of various signals generated using the method illustrated in the flow chart of FIGS. 9 and 10. In FIG. 11, the first to fourth switching cycles $T_{SW}$ are the normal region, the fifth to seventh switching cycles $T_{SW}$ are the dead time reducing region, and the eighth to tenth switching cycles $T_{SW}$ are the direct coupling region.

In FIG. 11, the timing signals St for outputting the drive signals UH, UL, VH, VL, WH, WL are represented by a drive signal processing cycle. In the first switching cycle $T_{sw}$ of FIG. 11, output of the timing signal St for generating the drive signal UH causes the timer 80 of the converter controller 54 to supply the high-level drive signal UH to the upper arm device 81u. At the same time, in step S10 of FIG. 9, the calculating unit 55 initiates the calculation process.

In step S11, the calculating unit 55 selects one of the phase arms UA, VA, WA as the target of the calculation process. As shown in FIG. 11, the phase arms are selected as the target in the order of U-phase arm UA, V-phase arm VA, and W-phase arm WA.

In step S12, the calculating unit 55 calculates the target secondary voltage V2 based on the fuel cell allocated load Lf received from the general controller 56. Then, the duty ratio DUT [%] is calculated based on the secondary voltage. The duty ratio DUT is the ratio of the upper arm device connection period T1 of the selected phase arm to the switching cycle $T_{SW}$.

In step S13, the calculating unit 55 calculates the first dead time dt1 (the dead time extending from the end of the previous lower arm device connection period T2 until the beginning of the current upper arm device connection period T1). Specifically, in step S131, the permission judging unit 74 of the calculating unit 55 checks a flag Flg that has been set most recently for the phase arm just before the phase arm targeted in the calculation process, to see whether or not the flag Flg is "1". (Note that the above-mentioned flag Flg will be also referred to hereinafter as "Flg_PREVIOUS-PHASE".) For example, if the U-phase arm UA is the target phase arm of the current calculation, the flag Flg to be checked is Flg_W-phase, which is the flag set for the phase arm just before the U-phase arm UA.

The flag Flg_PREVIOUS-PHASE indicates whether or not the lower arm device connection period T2 of the previous targeted phase arm was zero. If it was non-zero, the flag Flg_PREVIOUS-PHASE is "0" (low level), and if it was zero, Flg_PREVIOUS-PHASE is "1" (high level). The flag Flg_PREVIOUS-PHASE is held in registers 72u, 72v, 72w of the calculating unit 55 associated with the phase arms UA, VA, WA, respectively.

If the flag Flg_PREVIOUS-PHASE is "0", the calculating unit 55 sets the first dead time dt1 to the standard time period dtr (dt1=dtr), in step S132. In other words, the permission judging unit 74 prohibits execution of the first dead time dt1 reducing process for setting the first dead time dt1 to be shorter than the standard time period dtr (the detail of the first dead time dt1 reducing process will be described later). If the flag Flg_PREVIOUS-PHASE is "1", the calculating unit 55 executes, in step S133, the first dead time dt1 reducing process. In other words, the permission judging unit 74 permits the first dead time dt1 reducing process.

For example, in FIG. 11, at initiation of the calculation process for the fifth switching cycle $T_{SW}$ (V-phase arm VA), (the calculation process is executed during the first switching cycle $T_{SW}$), the flag Flg_U-PHASE for the previous switching cycle, which is the fourth switching cycle $T_{SW}$ (U-phase arm UA), is "0". Hence, the first dead time dt1 reducing process is not executed in the calculation process for the fifth switching cycle $T_{SW}$ (V-phase arm VA).

On the other hand, at initiation of the calculation process for the sixth switching cycle $T_{SW}$ (W-phase arm WA), which is also executed in the first switching cycle $T_{SW}$, the flag Flg_V-PHASE for the previous fifth switching cycle $T_{SW}$ (V-phase arm VA) is "1". Hence, the first dead time dt1 reducing process is executed in the calculation process for the sixth switching cycle $T_{SW}$ (W-phase arm WA).

In the subsequent steps S14 to S16, the calculating unit 55 calculates, based on the duty ratio DUT obtained in step S12, the second dead time dt2, upper arm device connection period T1, and lower arm device connection period T2 of the phase arm currently of interest, which will be referred to hereinafter as "target phase arm". Specifically, the calculating unit 55 calculates the current second dead time dt2, the current upper arm device connection period T1, and the current lower arm device connection period T2 using the relation among the duty ratio DUT, the second dead time dt2, upper arm device connection period T1, and the lower arm device connection period T2, which are stored in the table 71. Note that the resultant value of the upper arm device connection period T1 varies depending on whether or not the first dead time dt1 reducing process of step S133 has been executed (the detail of this change will be discussed later).

In step S17, the flag Flg of the target phase arm is updated. Specifically, in step S171, it is determined whether or not the current lower arm device connection period T2 is zero. If the current lower arm device connection period T2 is non-zero, the flag Flg for the current phase arm (hereinafter, also referred to as "Flg_CURRENT-PHASE") is newly set to "0" and stored into the corresponding register of the registers 72u, 72v, 72w (step S172). If the current lower arm device connection period T2 is zero, the flag Flg_CURRENT-PHASE is newly set to "1" and stored into the corresponding register of the registers 72u, 72v, 72w (step S173). The updated flag Flg_CURRENT-PHASE will be used in the calculation process for the next target phase arm as the flag Flg_PREVIOUS-PHASE. If the current target is the U-phase arm UA, for example, the flag Flg_U-PHASE will be used in the calculation process for the V-phase arm VA, which is the next target.

In step S18, the calculating unit 55 calculates whether or not the calculation process has been completed for all the phase arms UA, VA, WA (step S12-S17). If there is any phase arm UA, VA, WA for which the calculation process is not yet completed, the control returns to step S11.

If it is determined in step S18 that the calculation process for all the phase arms UA, VA, WA has been completed, the calculating unit 55 transmits the calculation results C for the phase arms UA, VA, WA to the operation command unit 57 (step S19).

In step S20, the operation command unit 57 stores the calculation results C for each of the phase arms UA, VA, WA to the corresponding registers 76u, 76v, 76w.

In step S21, the switching cycle determining unit 78 of the operation command unit 57 reads out the calculation results C from each register 76u, 76v, 76w and uses them to set the timer 80.

In step S22, the timer 80 outputs the drive signals UH, UL, VH, VL, WH, WL in accordance with the timings that has been set.

The mode of the DC/DC converter 36 for performing the above-described direct coupled shifting process by the converter controller 54 is referred to as a directly coupled mode.

FIG. 12 shows the output characteristics of the drive signals UH, UL, VH, VL, WH, WL in the first dead time dt1 reducing process of step S133 in FIG. 9 and the second dead time dt2 reducing process that will be described later. FIG. 12 shows the relationships of the upper arm device connection period T1, lower arm device connection period T2, first dead time dt1, and second dead time dt2 with respect to variation of the duty ratio DUT. Note that the switching cycle $T_{SW}$ is 60 μs, and the switching frequency $F_{SW}$ [cycles/sec] is about 16.7 kHz.

When the duty ratio DUT is less than first duty ratio threshold DUT_TH1, both the first dead time dt1 and the second dead time dt2 have a constant value equal to the standard time period dtr (i.e. dt1=dt2=dtr), which is approximately 5 μs, or 4.2% of the switching cycle $T_{SW}$, in FIG. 12. Further, when the duty ratio DUT is less than the first duty ratio threshold DUT_TH1, the upper arm device connection period T1 increases with the increase of the duty ratio DUT, and the lower arm device connection period T2 decreases with the increase of the duty ratio DUT. In other words, the upper arm device connection period T1 and the lower arm device connection period T2 are defined by equations (1) and (2), respectively.

$$T1 = T_{SW} \times (DUT/100) \quad (1)$$

$$T2 = T_{SW}\{(100-DUT)/100\} - 2dtr \quad (2)$$

When the duty ratio DUT reaches the first duty ratio threshold DUT_TH1, the lower arm device connection period T2 becomes zero (T2=0). The first duty ratio threshold DUT_TH1 is defined by equation (3) and is 91.6% in FIG. 12.

$$DUT\_TH1 = \{(T_{SW}-2dtr)/T_{SW}\} \times 100 \quad (3)$$

When the duty ratio DUT is greater than or equal to the first duty ratio threshold DUT_TH1 but less than the second duty ratio threshold DUT_TH2, the second dead time dt2 varies in accordance with the duty ratio DUT, as can be seen in FIG. 12. In other words, as the duty ratio DUT increases, the second dead time dt2 decreases (second dead time dt2 reducing process). The first dead time dt1, however, remains at the standard time period dtr (dt1=dtr), and the lower arm device connection period T2 is zero (T2=0). The second duty ratio threshold DUT_TH2 is defined by equation (4) and is 95.8% in FIG. 12.

$$DUT\_TH2 = 100 - \{(T_{SW} - dtr)/T_{SW}\} \quad (4)$$
$$= 100 - \{(100 - DUT\_TH1)/2\}$$

Further, the second dead time dt2 and the upper arm device connection period T1 are defined by equations (5) and (6), respectively.

$$dt2 = dtr \times \{(DUT\_TH2-DUT)/(DUT\_TH2-DUT\_TH1)\} \quad (5)$$

$$T1 = T_{SW} - dt1 - dt2 = T_{SW} - dtr - dt2 \quad (6)$$

When the duty ratio DUT is more than or equal to the second duty ratio threshold DUT_TH2 and the flag Flg_PREVIOUS-PHASE is "1" in step S131 of FIG. 9 (i.e. when the lower arm device connection period T2 of the previous target phase arm is zero), the first dead time dt1 varies in accordance with the duty ratio DUT, as shown in FIG. 12. Specifically, the first dead time dt1 decreases as the duty ratio DUT increases (first dead time dt1 reducing process). Note that the second dead time dt2 and the lower arm device connection period T2 are zero (dt2=T2=0). The first dead time dt1 and the upper arm device connection period T1 are defined by equations (7) and (8), respectively.

$$dt1 = dtr \times \{(100-DUT)/(100-DUT\_TH2)\} \quad (7)$$

$$T1 = T_{SW} - dt1 \quad (8)$$

It should be noted that if the flag Flg_PREVIOUS-PHASE is "0" in step S131 of FIG. 9 (i.e. the lower arm device connection period T2 of the previous target phase arm is non-zero), the first dead time dt1 has a value equal to the standard time period dtr (dt1=dtr), as shown in FIG. 13. In this case, since the upper arm device connection period T1 cannot exceed the second duty ratio threshold DUT_TH2, the upper arm device connection period T1 cannot be longer than approximately 55 μs duty ratio.

Figure 14:
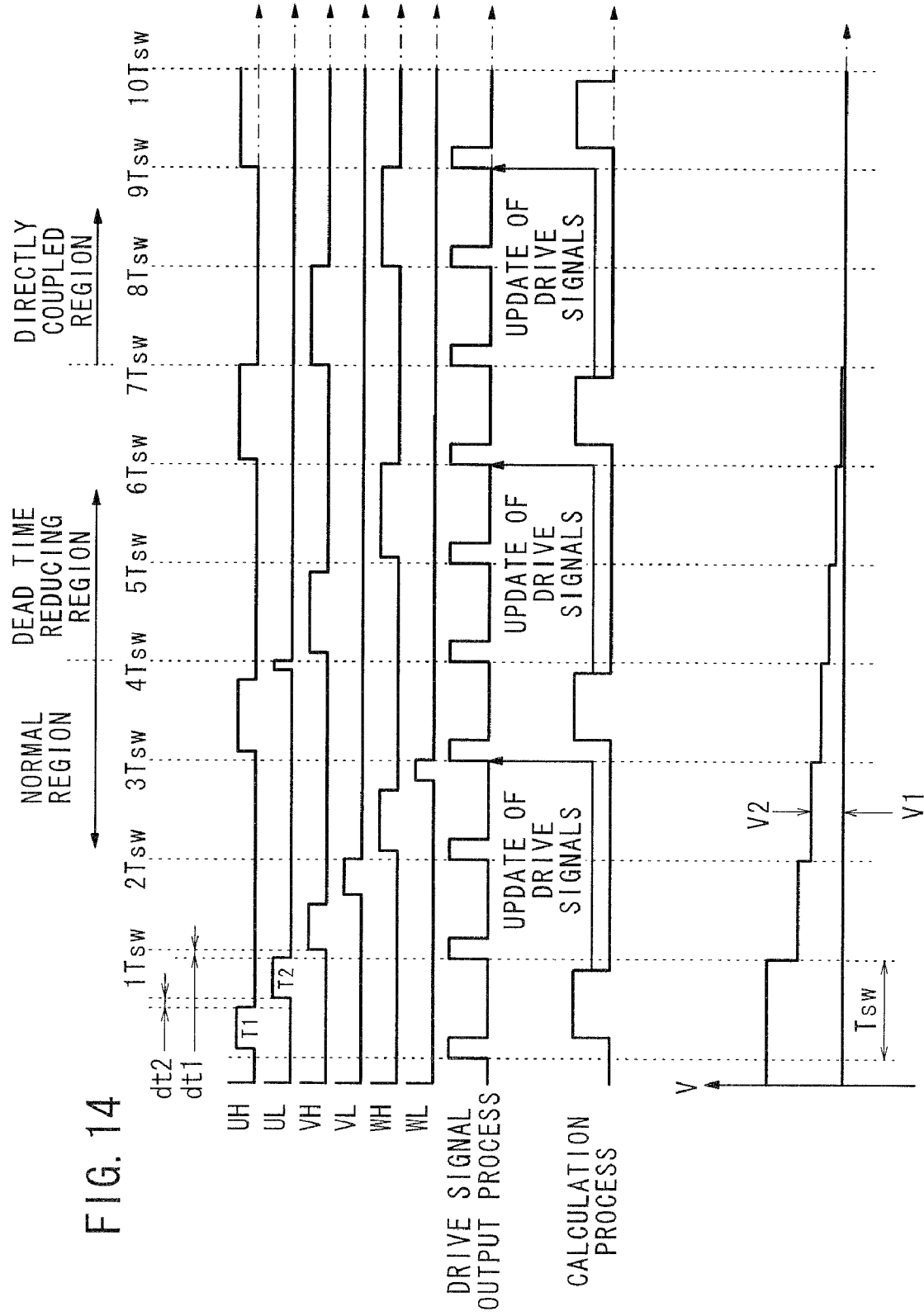
FIG. 14 is a schematic diagram illustrating a relationship between various gate drive signals and a secondary voltage according to the first embodiment.

Execution of the first dead time dt1 reducing process and the second dead time dt2 reducing process described above causes, as shown in FIG. 11, gradual reduction of the first dead time dt1 and the second dead time dt2, allowing the shift from the normal region to the direct coupling region. As shown in FIG. 14, this allows the second voltage V2 to gradually approach the first voltage V1, thereby achieving smooth shift from the normal region to the direct coupling region (V1≈V2).

3. Advantageous Effects of First Embodiment

As described above, in the first embodiment of the invention, when the current switching cycle $T_{SW}$ includes a lower arm device connection period T2, the first dead time dt1 of the next switching cycle $T_{SW}$ (the dead time dt directly before the upper arm device connection period T1) is not decreased. On the other hand, when the current switching cycle $T_{SW}$ includes no lower arm device connection period T2, the first dead time dt1 of the next switching cycle $T_{SW}$ is decreased so that the upper arm device connection period T1 can be increased. In this way, the first dead time dt1 can be reduced with a timing that prevents short circuits from being established between the upper arm devices 81u, 81v, 81w and the lower arm devices 82u, 82v, 82w. As a result, the battery 24 can be coupled directly with the fuel cell 22 and with the motor 26 in regenerative operation.

The calculating unit 55 calculates collectively the calculation results C of a plurality of switching cycles $T_{SW}$ (a plurality of phase arms UA, VA, WA), and transmits these calculation results C to the operation command unit 57. The short circuit between the upper arm devices 81u, 81v, 81w and the lower arm devices 82u, 82v, 82w can be avoided even if the calculation results C is determined collectively for a plurality of switching cycles $T_{SW}$, since the upper arm device connection period T1 and the first dead time dt1 for the first switching cycle $T_{SW}$ of the current calculation process are calculated based on the lower arm device connection period T2 of the last switching cycle $T_{SW}$ of the previous calculation process. Therefore, the first embodiment of the present invention can reduce the calculating time used by the calculating unit 55 while preventing a short circuit from occurring between the upper arm device 81u, 81v, 81w and the lower arm device 82u, 82v, 82w in the first switching cycle $T_{SW}$ of the current calculation process.

When the duty ratio DUT is between the first duty ratio threshold DUT_TH1 and the second duty ratio threshold DUT_TH2, the second dead time dt2 is gradually decreased and the upper arm device connection period T1 is gradually increased in accordance with the increase of the duty ratio DUT. Hence, the upper arm device connection period T1 can be increased as the second dead time dt2 is decreased, allowing smooth adjustment of the upper arm device connection period T1 in accordance with the variation of the duty ratio DUT.

When the duty ratio DUT is between the second duty ratio threshold DUT_TH2 and the possible maximum value of the duty ratio DUT, which is 100% in FIG. 12, the first dead time dt1 is gradually decreased, and the upper arm device connection period T1 is gradually increased. Hence, the upper arm device connection period T1 can be increased as the first dead time dt1 is decreased, allowing smooth adjustment of the upper arm device connection period T1 in accordance with the variation of the duty ratio DUT.

The VCU 23 is provided on the fuel cell vehicle 20. The DC/DC converter 36 has the fuel cell output control mode and the direct couple mode. In the fuel cell output control mode, the DC/DC converter 36 adjusts the voltage between the fuel cell 22 and the motor 26 to control the output of the fuel cell 22. In the direct couple mode, the DC/DC converter 36 connects only the upper arm devices 81u, 81v, 81w to directly couple the battery 24 with the fuel cell 22 and the motor 26. Hence, the fuel cell output mode allows the DC/DC converter 36 to control the output of the fuel cell 22, and the direct couple mode prevents the switching loss in the DC/DC converter 36 at the charge/discharge of the battery 24.

B. Second Embodiment

1. Description of Second Embodiment

The DC/DC converter apparatus according to the second embodiment of the present invention is basically the same as that of the first embodiment except in that the first dead time dt1 reducing process and the second dead time dt2 reducing process are executed in a different way.

Specifically, in the first dead time dt1 reducing process, whether or not the first dead time dt1 is reduced depends on whether or not the second dead time dt2 for the previous phase arm is zero. Further, in the second dead time dt2 reducing process, whether or not the second dead time dt2 is reduced depends on whether or not the lower arm device connection period T2 for the previous phase arm is zero.

Figure 15:
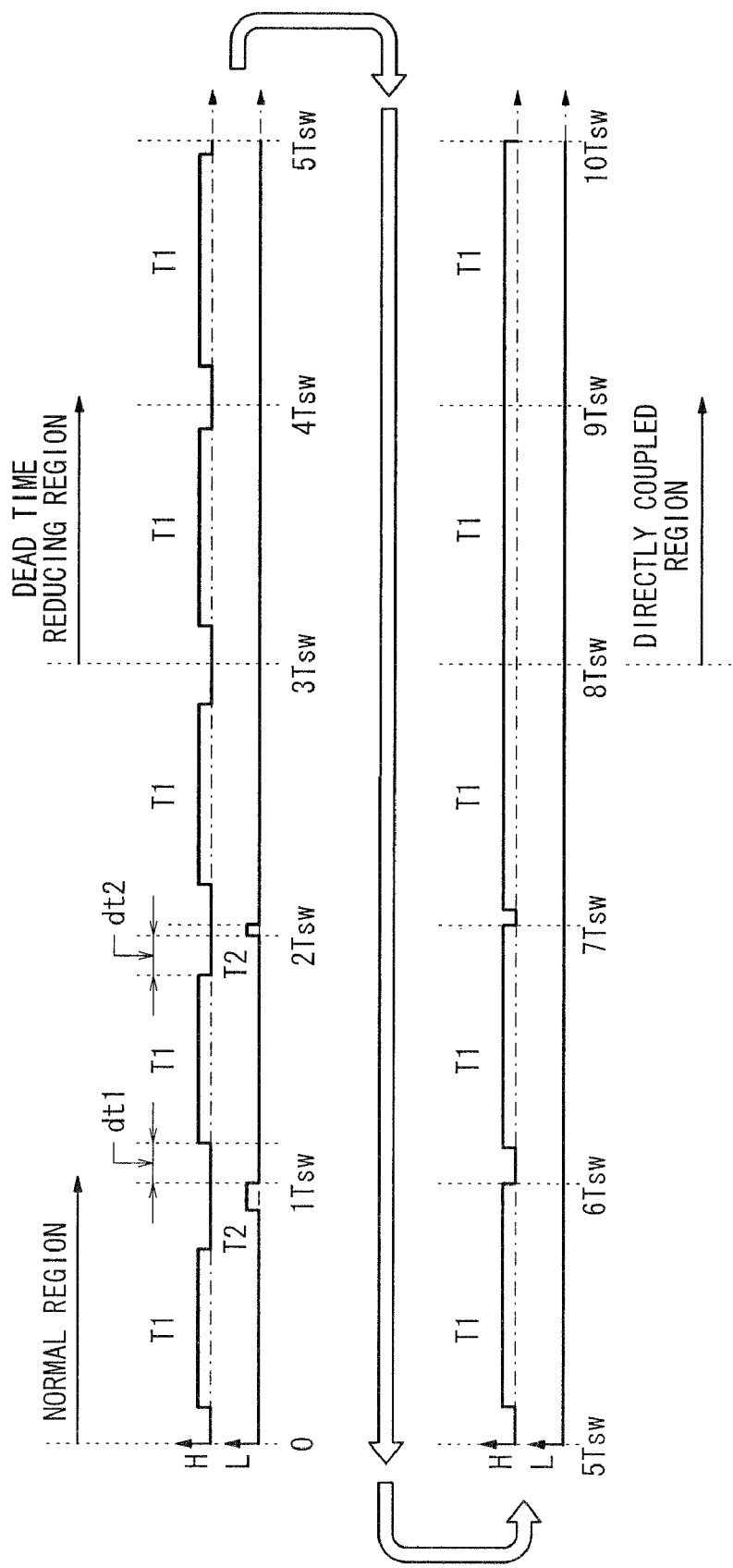
FIG. 15 is a schematic diagram illustrating a dead time reducing process according to a second embodiment of the present invention.

FIG. 15 schematically illustrates the dead time reducing process according to the second embodiment (the detail will be described later). In FIG. 15, the first to third switching cycles $T_{SW}$ are the normal region in which the lengths of the first dead time dt1 and the second dead time dt2 are constant (equal to the standard dead time period dtr). The fourth to eighth switching cycles $T_{SW}$ are the dead time reducing region in which the lower arm device connection period T2 is zero and the first dead time dt1 and second dead time dt2 are reduced. The ninth and tenth switching cycles $T_{SW}$ are the direct coupling region that includes no lower arm device connection period T2, first dead time dt1, and second dead time dt2, and hence, is entirely occupied by the upper arm device connection period T1.

It should be noted that distinctions among the phase arms UA, VA, WA are not made in FIG. 15. It should be also noted that the PWM control is also employed in the second embodiment of the invention. Hence, the length of each switching cycle $T_{sw}$ is constant in FIG. 15.

As with the first embodiment, the calculation results C (the upper arm device connection period T1, lower arm device connection period T2, first dead time dt1, and second dead time dt2) for the phase arms UA, VA, WA are calculated collectively.

Figure 16:
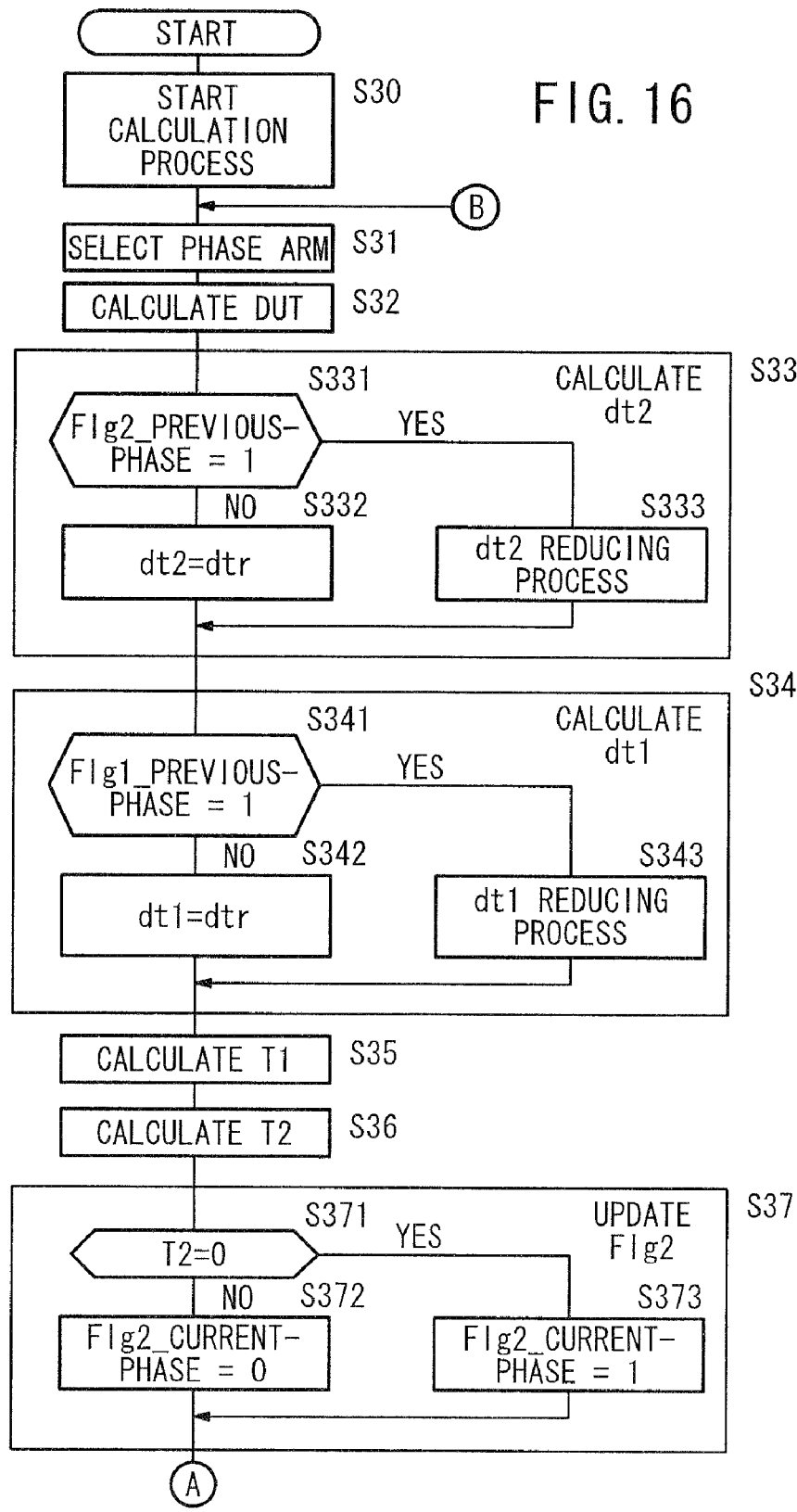
FIG. 16 is a first flow chart illustrating a process executed by a converter controller according to the second embodiment.
Figure 17:
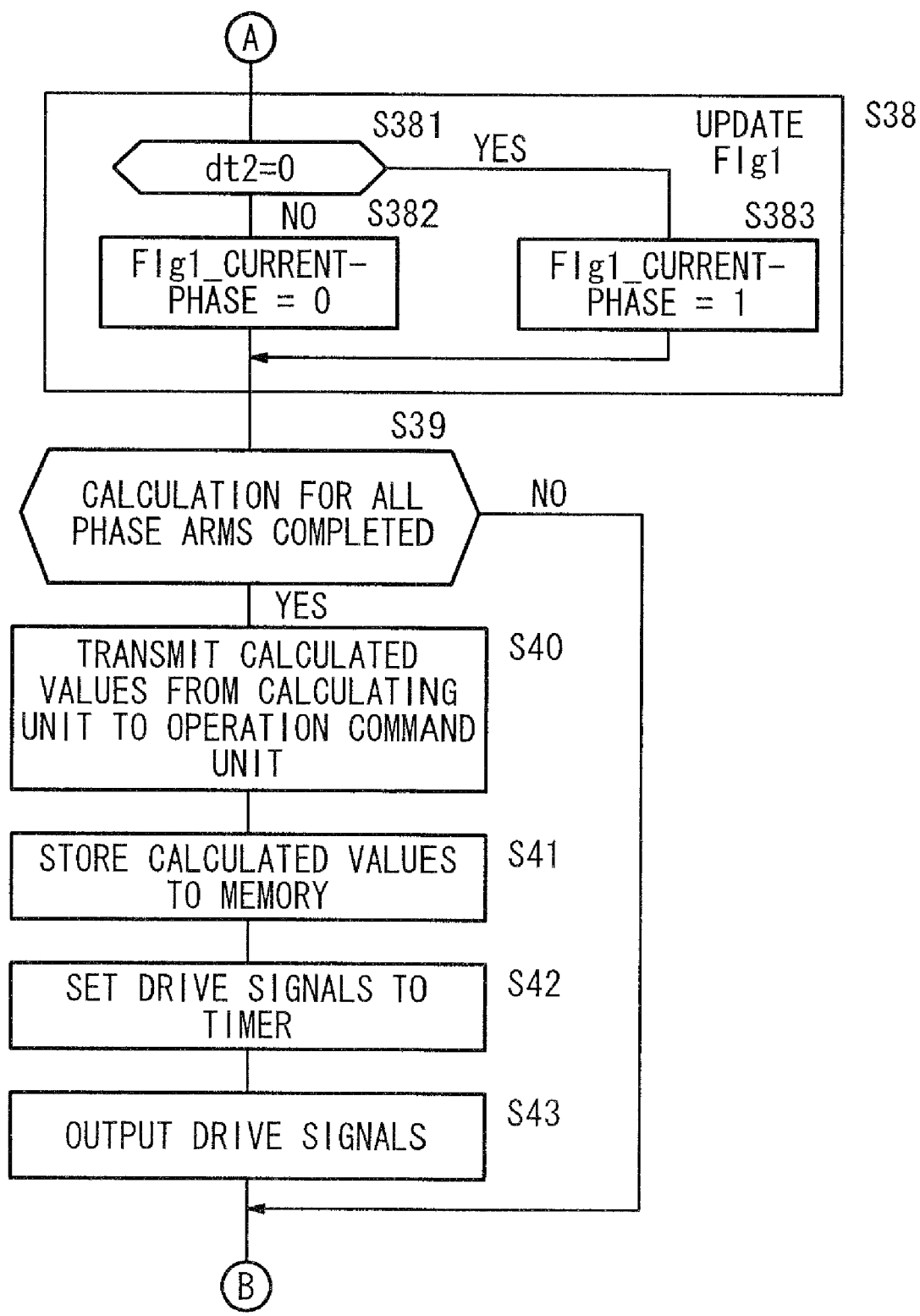
FIG. 17 is a second flow chart illustrating a process executed by a converter controller according to the second embodiment.
Figure 18:
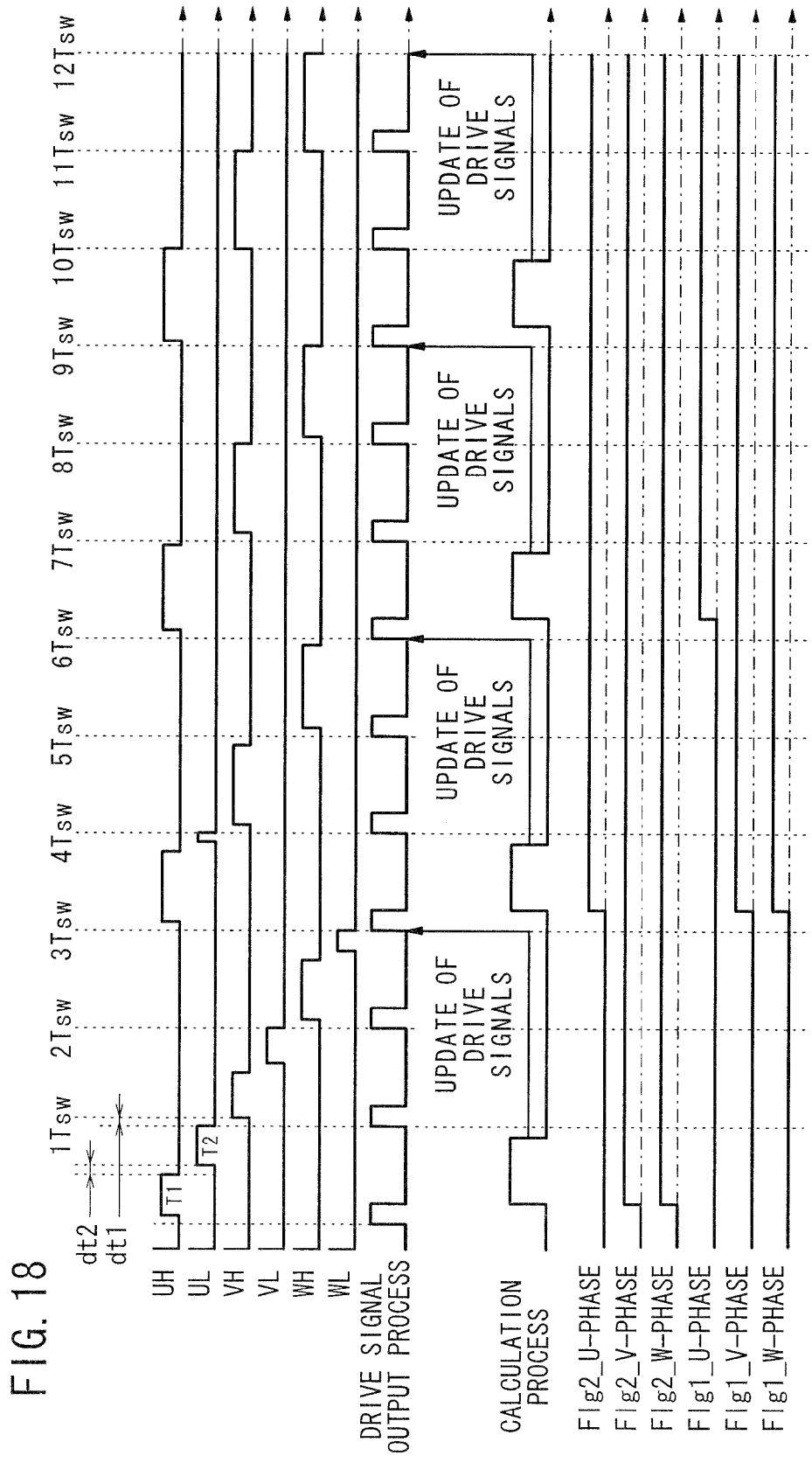
FIG. 18 is a timing chart of various signals according to the second embodiment.

FIGS. 16 and 17 shows a flow chart for calculating the upper arm device connection period T1, lower arm device connection period T2, first dead time dt1, and second dead time dt2, according to the second embodiment of the present invention. FIG. 18 shows an exemplary timing chart of various signals generated based on the method illustrated in the flow chart of FIGS. 16 and 17. In FIG. 18, the first to fifth switching cycles $T_{SW}$ are the normal region, the sixth to tenth switching cycles $T_{SW}$ are the dead time reducing region, and the eleventh and twelfth switching cycles $T_{SW}$ are the direct coupling region.

Note that the steps S30 to S32, S35, S36, and S39 to S43 in FIGS. 16 and 17 correspond to the steps S10 to S12, S15, S16, S18 to S22 in FIGS. 9 and 10.

In step S33, the calculating unit 55 calculates the second dead time dt2 (the dead time extending from the end of the current upper arm device connection period T1 to the beginning of the current lower arm device connection period T2). Specifically, in step S331, the permission judging unit 74 of the calculating unit 55 checks a second flag Flg2 that has been most recently set for the phase arm directly before the phase arm targeted in the calculation process, to see whether or not the second flag Flg 2 is "1". Note that the above-mentioned flag Flg2 will be also referred to hereinafter as "Flg2_PREVIOUS-PHASE".

The second flag Flg2_PREVIOUS-PHASE indicates whether or not the lower arm device connection period T2 of the previous target phase arm was zero. If it was non-zero, Flg2_PREVIOUS-PHASE is "0" (low level), and if it was zero, Flg2_PREVIOUS-PHASE is "1" (high level). The second flag Flg2_PREVIOUS-PHASE is held in registers 72*u*, 72*v*, 72*w* of the calculating unit 55 associated with the phase arms UA, VA, WA, respectively.

If the second flag Flg2_PREVIOUS-PHASE is "0", the calculating unit 55 sets, in step S332, the second dead time dt2 to the standard time period dtr (dt2=dtr). In other words, the permission judging unit 74 prohibits the execution of the second dead time dt2 reducing process similar to that of the first embodiment. If the second flag Flg2_PREVIOUS-PHASE is "1", the calculating unit 55 executes, in step S333, the second dead time dt2 reducing process. In other words, the permission judging unit 74 permits the second dead time dt2 reducing process.

For example, in FIG. 18, at initiation of the calculation process for the fifth switching cycle $T_{SW}$ (V-phase arm VA), (the calculation process is executed during the first switching cycle $T_{SW}$), the second flag Flg2_U-PHASE for the previous switching cycle, or the fourth switching cycle $T_{SW}$ (U-phase arm UA), is "0". Hence, the second dead time dt2 reducing process is not executed in the calculation process for the fifth switching cycle $T_{SW}$ (V-phase arm VA).

On the other hand, at initiation of the calculation process for the sixth switching cycle $T_{SW}$ (W-phase arm WA), which is also executed in the first switching cycle $T_{SW}$, the second flag Flg2_V-PHASE for the previous fifth switching cycle $T_{SW}$ (V-phase arm VA) is "1". Hence, the second dead time dt2 reducing process is executed in the calculation process for the sixth switching cycle $T_{SW}$ (W-phase arm WA).

In step S34, the calculating unit 55 calculates the first dead time dt1 (the dead time dt extending from the end of the previous lower arm device connection period T2 to the beginning of the current upper arm device connection period T1). Specifically, in step S341, the permission judging unit 74 of the calculating unit 55 checks a first flag Flg1 that has been most recently set for the phase arm directly before the phase arm targeted in the calculation process and confirms whether the first flag Flg 1 is "1" or not. (Note that the above-mentioned flag Flg1 will be also referred to hereinafter as "Flg1_PREVIOUS-PHASE".) For example, if the U-phase arm UA is the target phase arm of the current calculation, the first flag Flg1_W-phase set for the W-phase arm WA, i.e. the phase arm directly before the U-phase arm UA, is checked.

The first flag Flg1_PREVIOUS-PHASE indicates whether or not the second dead time dt2 of the previous target phase arm was zero. If it was non-zero, Flg1_PREVIOUS-PHASE is "0" (low level), and if it was zero, Flg1_PREVIOUS-PHASE is "1" (high level). The first flag Flg1_PREVIOUS-PHASE is held in registers 72*u*, 72*v*, 72*w* of the calculating unit 55 associated with the phase arms UA, VA, WA, respectively.

If the first flag Flg1_PREVIOUS-PHASE is "0", the calculating unit 55 sets, in step S342, the first dead time dt1 to the standard time period dtr (dt1=dtr). In other words, the permission judging unit 74 prohibits the execution of the first dead time dt1 reducing process similar to that of the first embodiment. If the first flag Flg1 is "1", the calculating unit 55 executes, in step S343, the first dead time dt1 reducing process. In other words, the permission judging unit 74 permits the first dead time dt1 reducing process.

For example, in FIG. 18, at initiation of the calculation process for seventh switching cycle $T_{SW}$ (U-phase arm UA), (the calculation process is executed during the fourth switching cycle $T_{SW}$), the first flag Flg1_W-PHASE for the previous switching cycle, which is the sixth switching cycle $T_{SW}$ (W-phase arm WA), is "0". Hence, the first dead time dt1 reducing process is not executed in the calculation process for the seventh switching cycle $T_{SW}$ (U-phase arm UA).

On the other hand, at initiation of the calculation process for the ninth switching cycle $T_{SW}$ (W-phase arm WA), which is also executed in the fourth switching cycle $T_{SW}$, the first flag Flg1_V-PHASE for the previous eighth switching cycle $T_{SW}$ (V-phase arm VA) is "1". Hence, the first dead time dt1 reducing process is executed in the calculation process for the ninth switching cycle $T_{SW}$ (W-phase arm WA).

The process of step S37 in FIG. 16 is associated with the second flag Flg2 and hence differs from step S17 in FIG. 9 which is associated with the flag Flg. The contents of the flag Flg and the second flag Flg2, however, are substantially the same and so step S37 and step S17 are substantially the same.

In step S38, the first flag Flg1 of the current target phase arm is updated. Specifically, in step S381, it is determined whether or not the second dead time dt2 thereof is zero. If the second dead time dt2 is non-zero, the first flag Flg1 (hereinafter, referred to as "Flg1_CURRENT-PHASE") is updated to "0" and stored into the corresponding register of the registers 72*u*, 72*v*, 72*w* (step S382). If the second dead time dt2 is zero, the first flag Flg1 is updated to "1" and stored into the corresponding register of the registers 72*u*, 72*v*, 72*w* (step S383). The updated first flag Flg1_CURRENT-PHASE is used in the calculation process for the next target phase arm as the first flag Flg_PREVIOUS-PHASE. If the current target is the W-phase arm WA, for example, the first flag Flg1_W-PHASE will be used in the calculation process for the U-phase arm UA, which is the next target.

Figure 19:
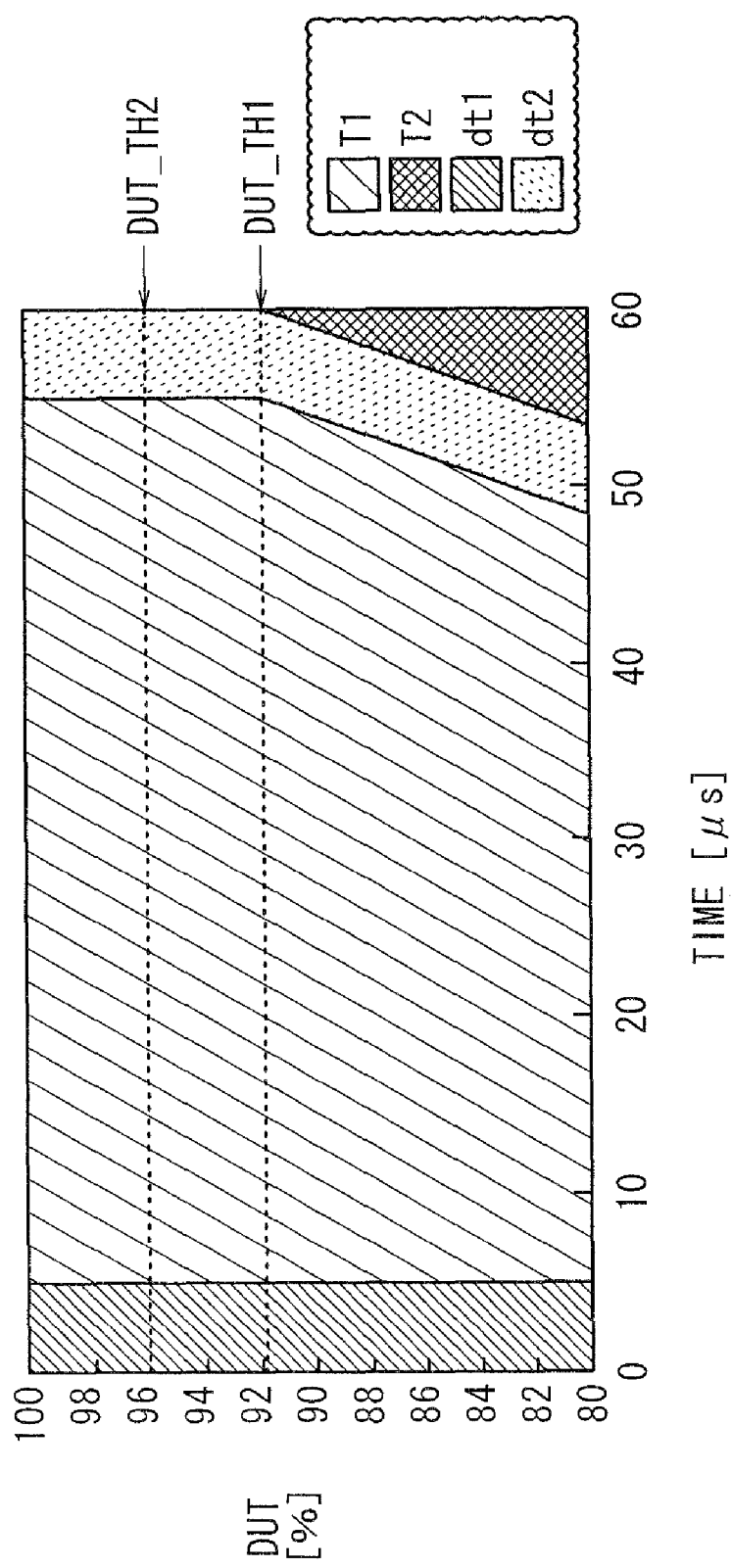
FIG. 19 is a diagram illustrating an output characteristic of a gate drive signal generated without the dead time reducing process according to the second embodiment.

The first dead time dt1 reducing process and the second dead time dt2 reducing process of the second embodiment are similar to those of the first embodiment. However, if the second flag Flg2_PREVIOUS-PHASE is "0" in step 331 (if the lower arm device connection period T2 of the previous target phase arm was non-zero), the second dead time dt2 is set to the standard time period dtr (dt2=dtr) in step S332. In this case, the first dead time dt1 and the second dead time dt2 become equal to the standard time period dtr (dt1=dt2=dtr), as shown in FIG. 19. In this case, since the upper device element connection period T1 cannot exceed the first duty ratio threshold DUT_TH1, the upper arm device connection period T1 has a constant value of about 50 µs (T1=$T_{SW}$−dt1−dt2=$T_{SW}$−2dtr).

2. Advantageous Effects of Second Embodiment

The second embodiment of the invention as described above provides the following advantageous effects in addition to as the effects of the first embodiment. In the second embodiment, the first dead time dt1 is reduced only after the second dead time dt2 has been reduced to zero. Before the second dead time dt2 becomes zero, the lower arm device connection period T2 decreases to zero. Hence, as long as the previous switching cycle $T_{SW}$ includes the lower arm device connection period T2, the first dead time dt1 is not reduced during the current switching period $T_{SW}$. As a result, short circuits between the upper arm devices 81u, 81v, 81w and the lower arm devices 82u, 82v, 82w can be more reliably prevented.

C. Third Embodiment

1. Description of Third Embodiment

The DC/DC converter apparatus according to the third embodiment of the present invention is basically the same as that of the first embodiment except in that it utilizes not only the PWM control, but also a combination of the PWM control and the PFM control.

The third embodiment utilizes the PFM control when the PWM control causes unstable operation of the switching devices used in the upper arm devices 81u to 81w and lower arm devices 82u to 82w. To turn on the above-mentioned switching devices, holding times (i.e. the upper arm device connection period T1 and the lower arm device connection period T2) for holding the drive signals UH, UL, VH, VL, WH, WL at a high level must be more than or equal to a predetermined value (1.5 μs, for example). However, even if the holding time is more than a value that is in the vicinity of the predetermined value, the switching devices may still operate unstably. Therefore, if the upper arm device connection period T1 or the lower arm device connection period T2 is less than or equal to a value (4.2 μs, for example) that is obtained by giving the above-mentioned predetermined value some margin, the PWM control is switched to the PFM control. With the PFM control, the length of the switching cycles $T_{SW}$ is changed while the upper arm device connection period T1 or the lower arm device connection period T2 is kept constant in each switching cycle $T_{SW}$.

Figure 20:
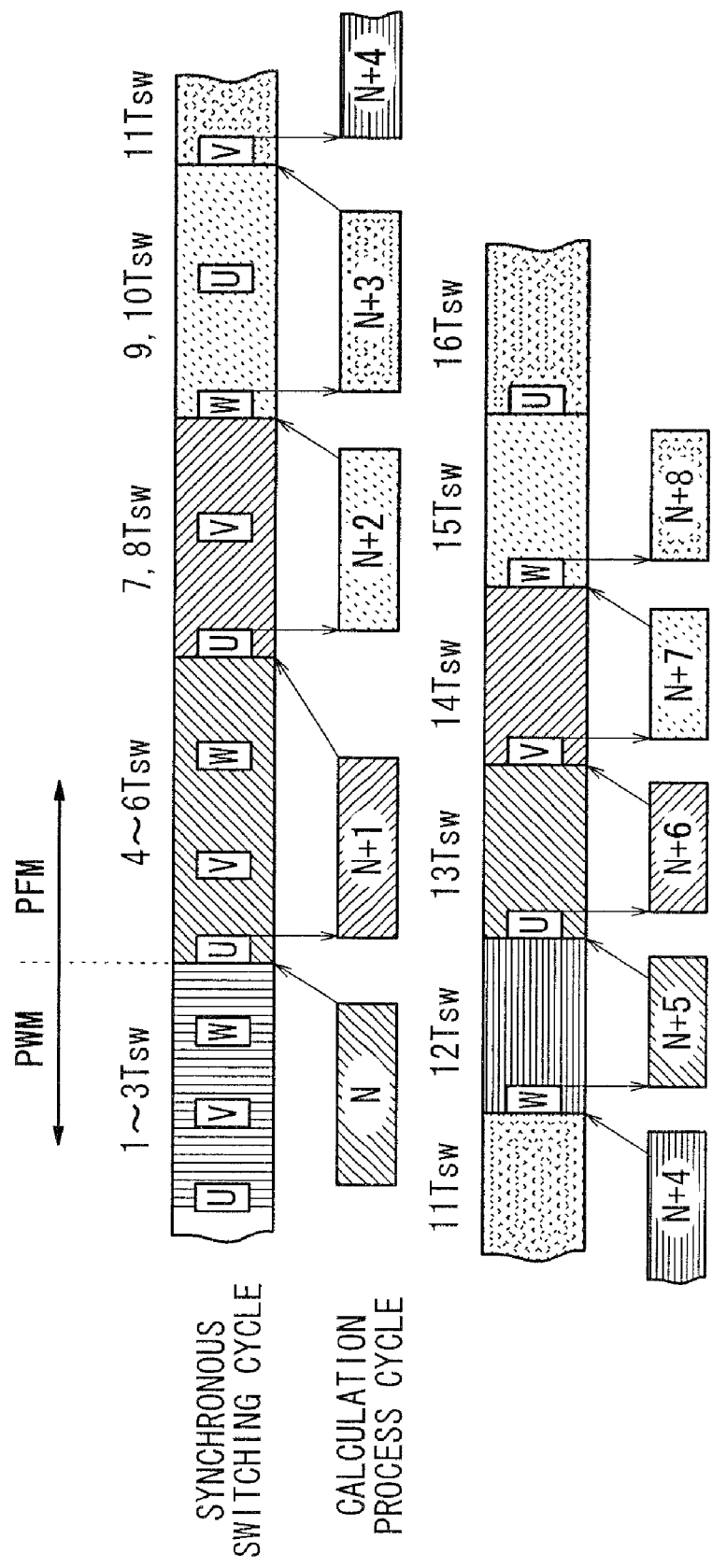
FIG. 20 is a schematic diagram illustrating a relationship between a synchronous switching cycle and a calculation process cycle according to a third embodiment of the present invention.

FIG. 20 shows a conceptual diagram of a control employing a combination of the PWM control and the PFM control. In FIG. 20, the first to third switching cycles $T_{SW}$ are controlled with PWM, and the fourth or later switching cycles $T_{SW}$ with PFM. In PWM control, each switching cycle $T_{SW}$ has the same length, and the ON/OFF operation of the upper arm devices 81u to 81w and the lower arm devices 82u to 82w are controlled by varying the lengths of the upper arm device connection period T1 and the lower arm device connection period T2. In the PFM control, however, the shorter one of the upper arm device connection period T1 and the lower arm device connection period T2 is kept at a constant length while the length of each switching cycle $T_{SW}$ is changed to control the ON/OFF operation of the upper arm devices 81u to 81w and the lower arm devices 82u to 82w.

In the third embodiment, the converter controller 54 determines, in both PWM control and PFM control, the calculation results C for all three phase arms UA, VA, WA in a single calculation process. The calculation results C are determined in a fixed order of the U-phase arm UA, V-phase arm VA, and W-phase arm WA. In PWM control, all of the calculation results C are utilized. After shifting to PFM control, however, it may be the case that the calculation results C for only one or two of the three phase-arms UA, VA, WA are actually used (see the N+1th or subsequent calculation processes in FIG. 20). The detail of the above will be described later.

Figure 21:
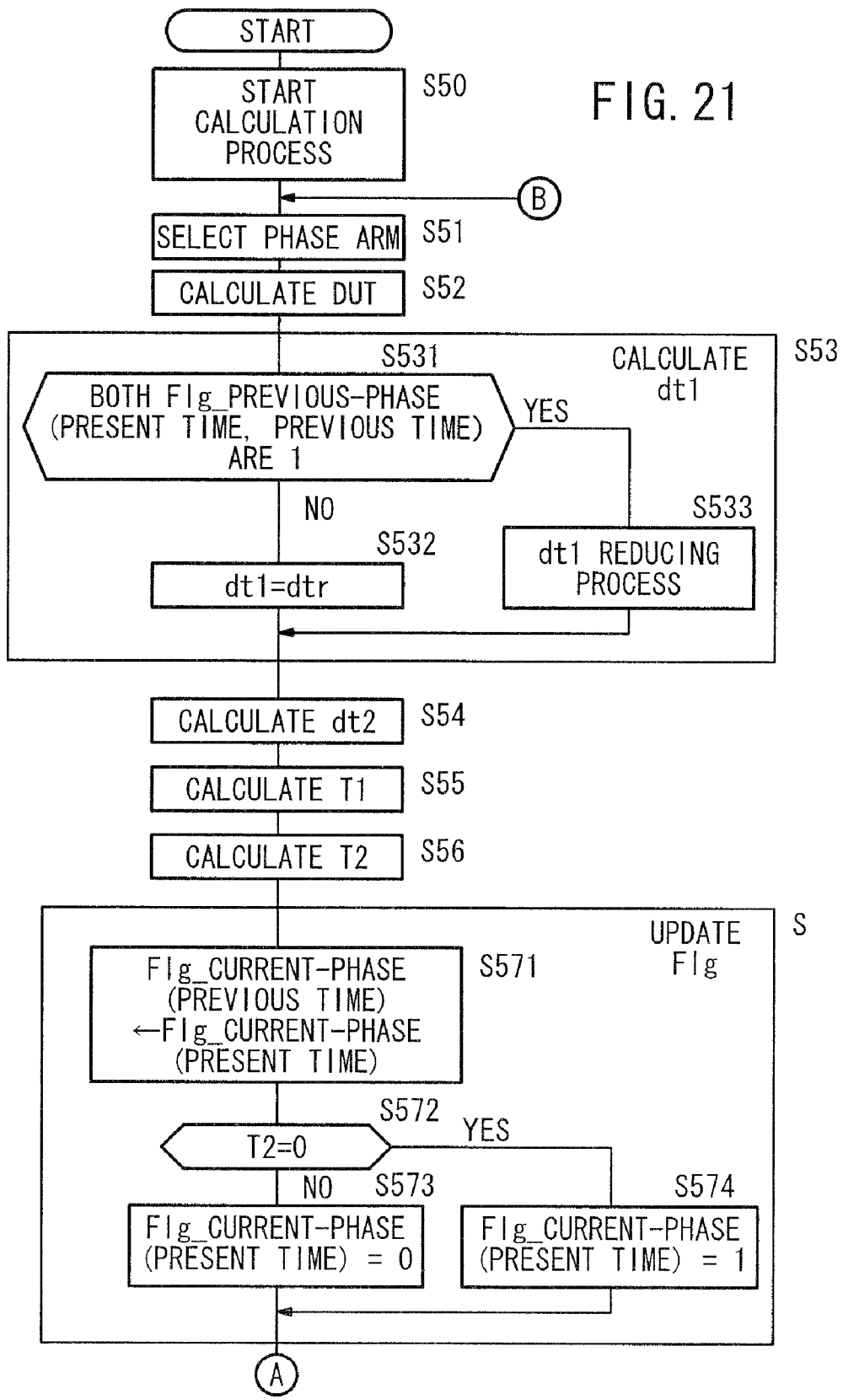
FIG. 21 is a first flow chart illustrating a process executed by a converter controller according to the third embodiment.
Figure 22:
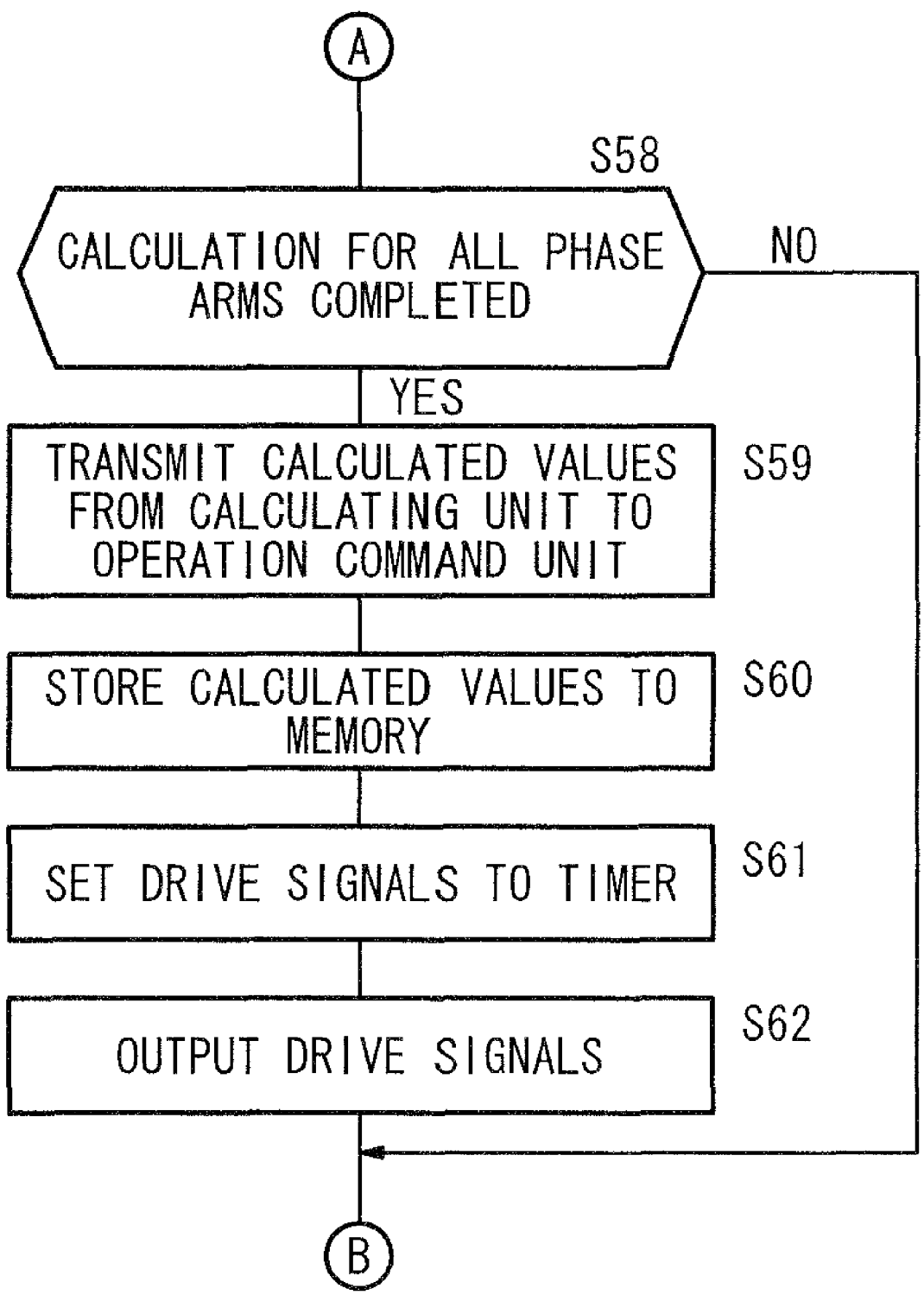
FIG. 22 is a second flow chart illustrating a process executed by a converter controller according to the third embodiment.
Figure 23:
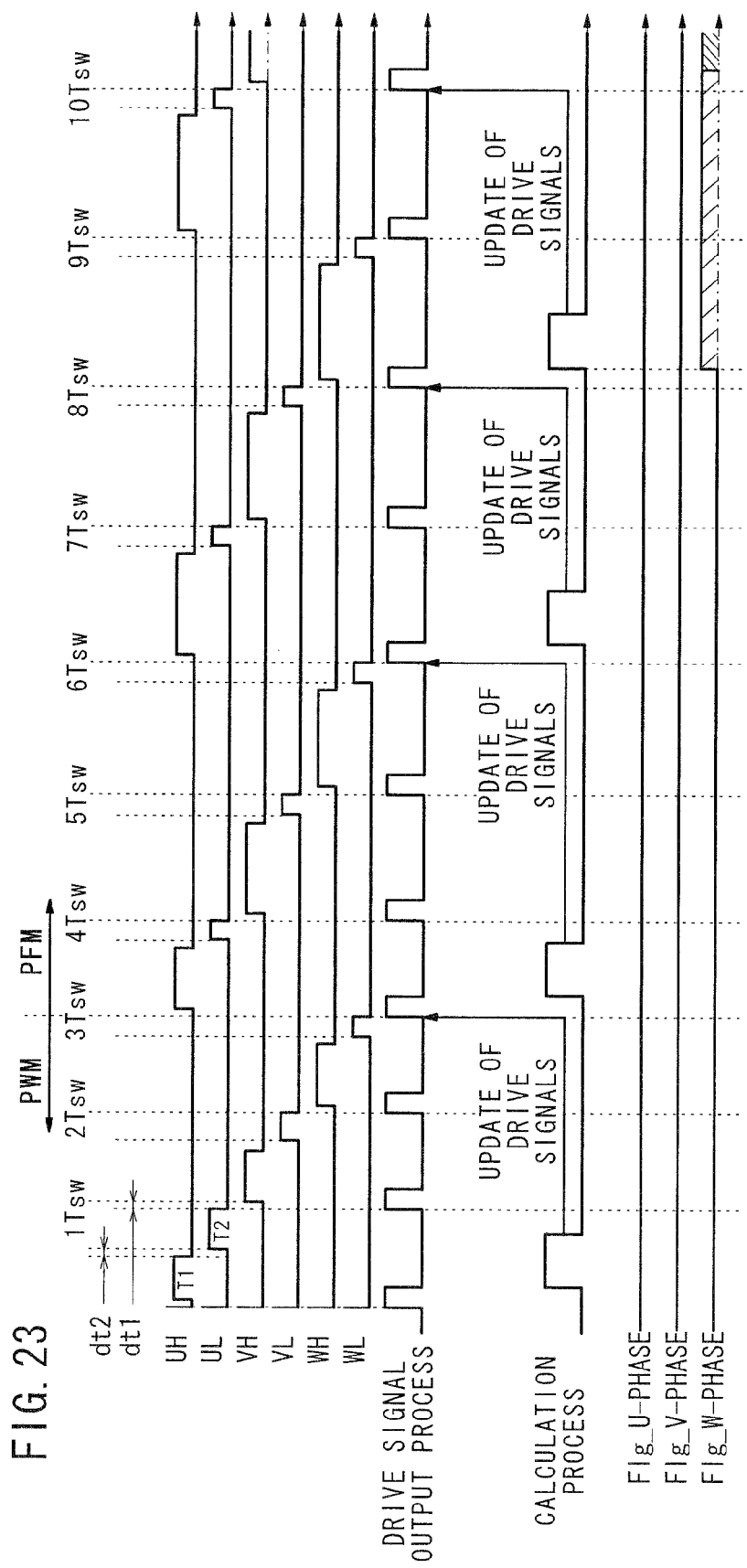
FIG. 23 is a first timing chart of various signals according to the third embodiment.
Figure 24:
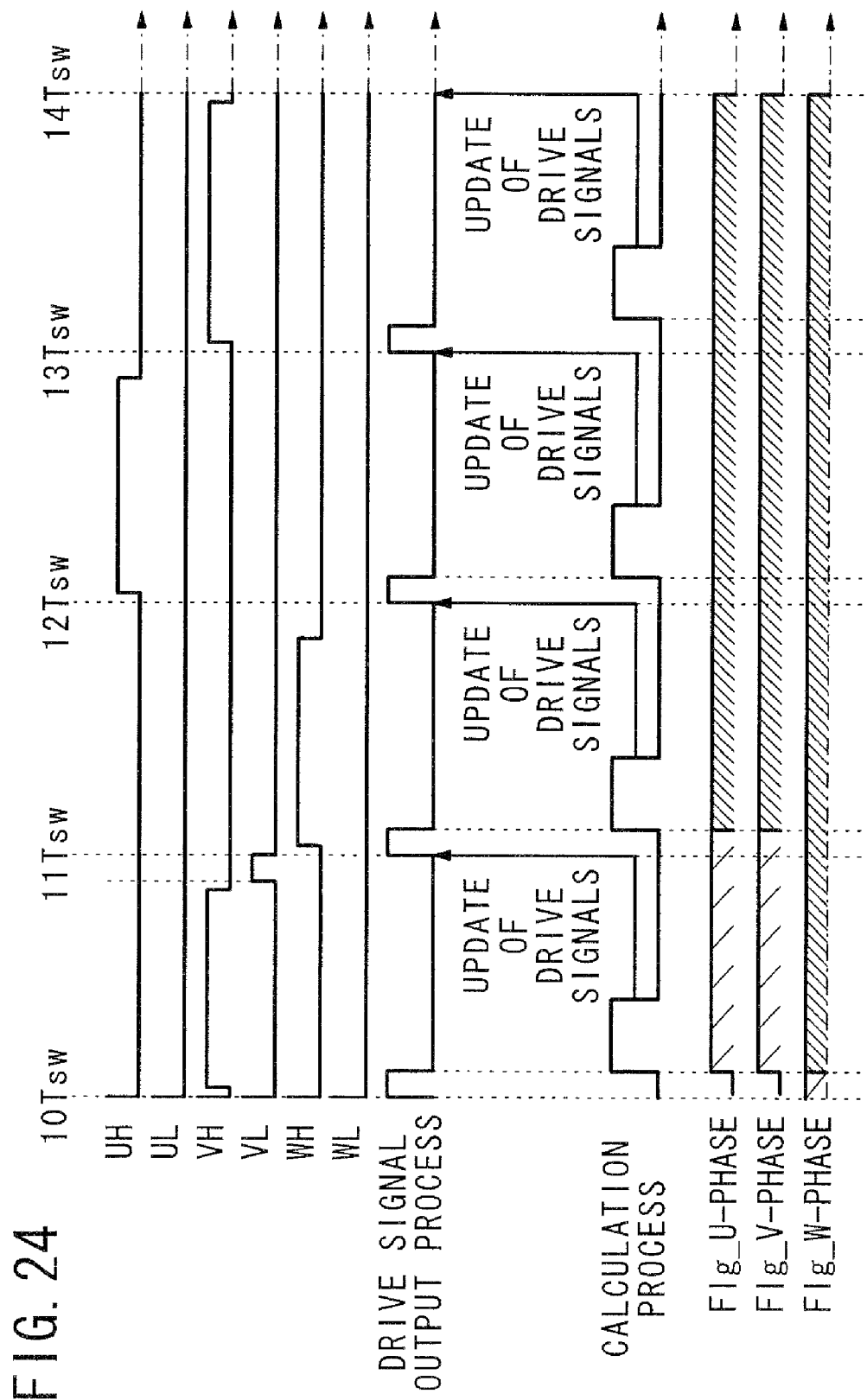
FIG. 24 is a second timing chart of various signals according to the third embodiment.
Figure 25:
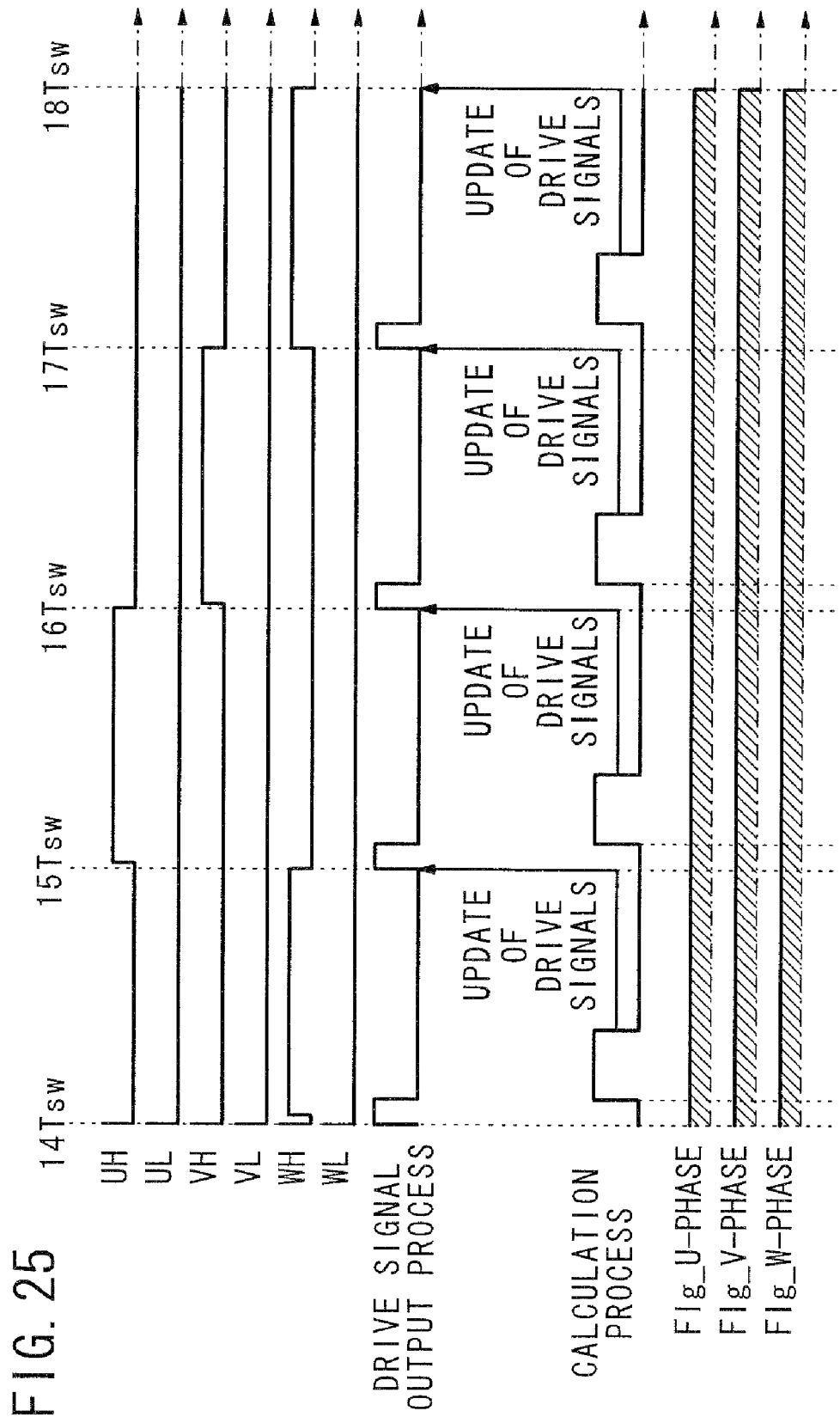
FIG. 25 is a third timing chart of various signals according to the third embodiment.

FIGS. 21 and 22 show a flow chart for calculating the upper arm device connection period T1, lower arm device connection period T2, first dead time dt1, and second dead time dt2. FIGS. 23 through 25 show an exemplary timing chart of various signals generated based on the method illustrated in the flow chart of FIGS. 21 and 22. In FIGS. 23 through 25, the first to twelfth switching cycles $T_{SW}$ are the normal region where the first dead time dt1 and the second dead time dt2 have a constant length (the standard time period dtr). The thirteenth to seventeenth switching cycles $T_{SW}$ are the dead time reducing region where the first dead time dt1 or the second dead time dt2 gradually decreases. The eighteenth switching cycles $T_{SW}$ is the direct coupling region where the first dead time dt1 and the second dead time dt2 are zero.

Steps S50 through S62 in FIGS. 21 and 22 basically correspond to steps S10 through S22 in FIGS. 9 and 10. Hence, the flow chart in FIGS. 21 and 22 will be described hereinafter with attention being paid to the difference from FIGS. 9 and 10.

In step S53 of FIG. 21, the calculating unit 55 of the converter controller 54 calculates the first dead time dt1. Specifically, in step S531, the permission judging unit 74 in the calculating unit 55 checks a flag Flg that has been most recently set for the phase arm directly before the target phase arm of the calculation process (the flag will be referred to hereinafter as "Flg_PREVIOUS-PHASE(PRESENT TIME)") and a flag Flg that has been set in the previous time (the flag will be referred to hereinafter as "Flg_PREVIOUS-PHASE(PREVIOUS TIME)"), to see whether or not both flags are "1". For example, if the current target phase arm of the calculation is the U-phase arm UA, the flag Flg_W-PHASE(PRESENT TIME) and flag Flg_W-PHASE(PREVIOUS TIME), which have been set most recently and in the previous time, respectively, for the W phase arm WA, i.e. the previous phase arm, are checked.

If at least one of the flags Flg_PREVIOUS-PHASE (PRESENT TIME) and Flg_PREVIOUS-PHASE(PREVIOUS TIME) (which will be also collectively referred to as flag Flg_PREVIOUS-PHASE(PRESENT TIME, PREVIOUS TIME)) is "0", the calculating unit 55 sets, in step S532, the first dead time dt1 to the standard time period dtr (dt1=dtr). In other words, the permission judging unit 74 prohibits the first dead time dt1 reducing process similar to that in the first embodiment. If both flag Flg_PREVIOUS-PHASE(PRESENT TIME) and flag Flg_PREVIOUS-PHASE(PREVIOUS TIME) are "1", the calculating unit 55 executes, in step S533, the first dead time dt1 reducing process. In other words, the permission judging unit 74 permits the first dead time dt1 reducing process.

In FIGS. 23 through 25, the settings of the flag Flg are shown as below. In the flag Flg, the regions shaded with lines from top left to bottom right indicate that one of the "PRESENT TIME" and "PREVIOUS TIME" flags is "1", and the regions shaded with lines from top right to bottom left indicate that both the "PRESENT TIME" and "PREVIOUS TIME" flags are "1".

The flag Flg_W-PHASE of the ninth switching cycle $T_{SW}$ in FIG. 23, for example, is shaded with lines from top left to bottom right, and the flag Flg_W-PHASE of the previous switching cycle $T_{SW}$, i.e. the eighth switching cycle $T_{SW}$, includes no high level region. Therefore, the flag Flg_W-PHASE of the ninth switching cycle $T_{SW}$ indicates that the flag Flg_W-PHASE(PRESENT TIME) is "1" and the flag Flg_W-PHASE(PREVIOUS TIME) is "0".

In the twelfth switching cycle $T_{SW}$ of FIG. 24, none of the drive signals UH, UL, VH, VL includes high level. In the eleventh switching cycle $T_{SW}$, however, the flag Flg_U-phase and the flag Flg_V-phase are represented by diagonal lines from top left to bottom right. This shows that the calculation results C for the lower arm device connection periods T2 of the U-phase arm UA and the V-phase arm VA are zero.

As described above, the third embodiment of the invention sets the flag Flg_PREVIOUS-PHASE(PRESENT TIME, PREVIOUS TIME) not based on the actual state of the drive signals UH, UL, VH, VL, WH, WL, but on the calculation results C provided by the calculating unit 55.

In FIGS. 23 to 25, the first calculation process that is performed after both flags Flg_PREVIOUS-PHASE (PRESENT TIME, PREVIOUS TIME) has become "1" is the calculation process for the drive signal UH in the thirteenth switching cycle $T_{SW}$. Hence, in this drive signal UH, the first dead time dt1 reducing process can be first performed. It should be noted, however, that the first dead time dt1 is not reduced in FIG. 24 due to the relation with the duty ratio DUT.

In step S54, the calculating unit 55 calculates the second dead time dt2. In other words, the value of the second dead time dt2 is determined, as in the first embodiment, in accordance with the duty ratio DUT calculated in step S52.

In steps S55 and S56, the calculating unit 55 calculates the switching cycle $T_{SW}$ of the current target phase arm based on the duty ratio DUT obtained in step S52. Specifically, the calculating unit 55 uses the relationship between the duty ratio DUT and the switching cycle $T_{SW}$ stored in the table 71 to calculate the switching cycle $T_{SW}$, and then calculates the current upper arm device connection period T1 and the current lower arm device connection period T2 that depend on the switching cycle $T_{SW}$.

In step S57, the flag Flg_CURRENT-PHASE(PRESENT TIME, PREVIOUS TIME) of the current target phase arm is updated. Specifically, in step S571, the flag Flg_CURRENT-PHASE(PRESENT TIME) is set to a new flag Flg_CURRENT-PHASE(PREVIOUS TIME). The subsequent steps S572 through S574 are the same as the steps S171 through S173 in FIG. 9.

The subsequent steps S58 through S62 are the same as the steps S18 through S22 in FIG. 10. However, in the PFM control of the third embodiment, not all of the calculation results C for the three phase arms UA, VA, WA may be used in step S61.

Figure 26:
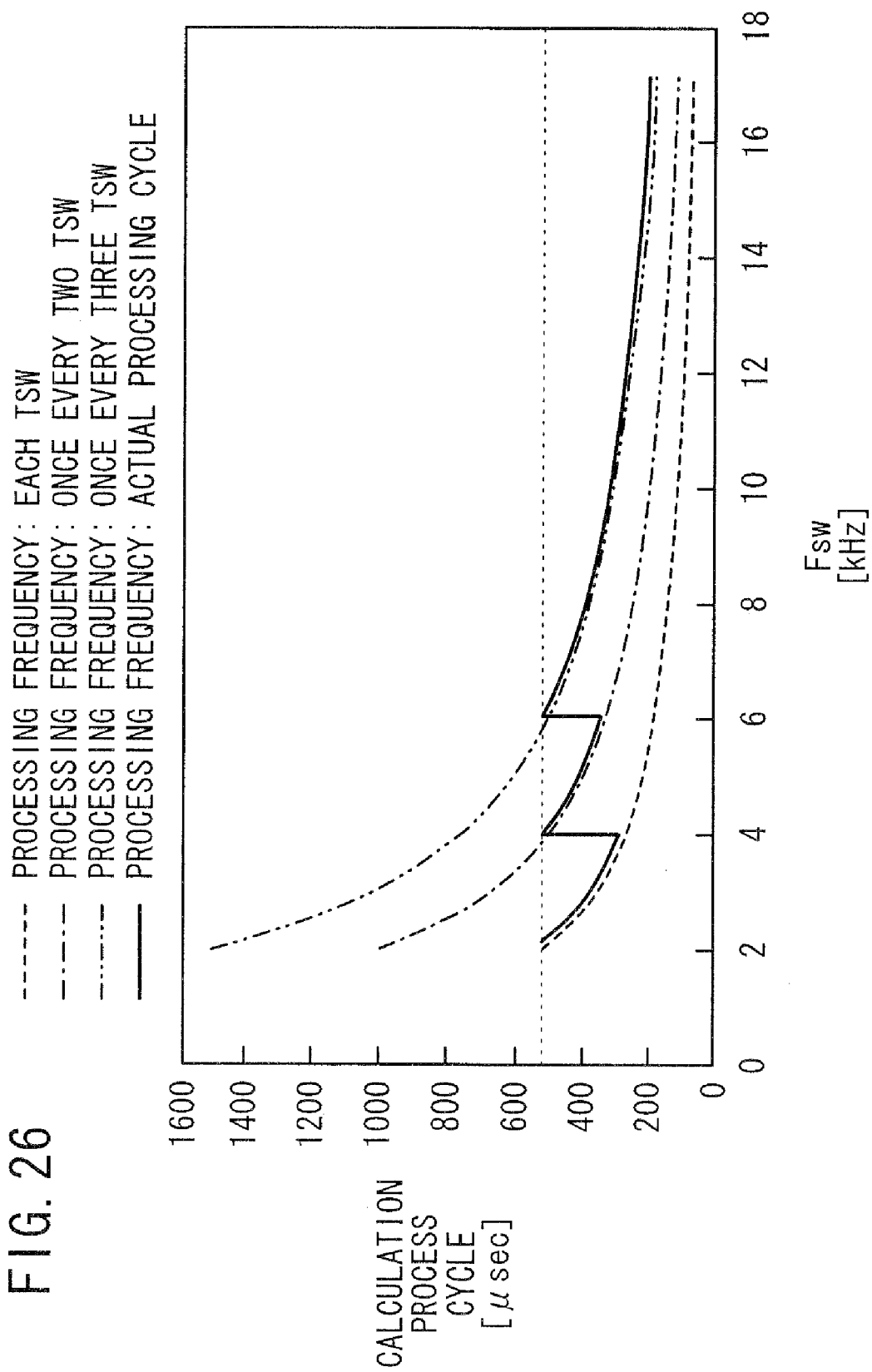
FIG. 26 is a diagram illustrating a relationship between a switching frequency and a calculation processing frequency in the third embodiment.

In other words, as shown in FIG. 26, the length of the cycle [μs] over which one calculation process is performed varies in accordance with the switching frequency $F_{SW}$, which has substantially the same meaning as the switching cycle $T_{SW}$. Hence, the switching cycle $T_{SW}$ is made longer, and the difficulties in setting the upper arm device connection period T1 and the lower arm device connection period T2 under certain current states can be avoided.

In FIG. 26, the calculating unit 55 executes one calculation process for each three switching cycles $T_{SW}$ when the switching frequency $F_{SW}$ is not less than 6 kHz (i.e. the switching cycle $T_{SW}$ is not more than about 166.7 μs). When the switching frequency $F_{SW}$ is greater than or equal to 4 kHz but less than 6 kHz (i.e. the switching cycle $T_{SW}$ is more than about 166.7 μs but less than or equal to about 250 μs), the calculating unit 55 executes one calculation process for each two switching cycles $T_{SW}$. When the switching frequency $F_{SW}$ is less than 4 kHz (i.e. the switching cycle $T_{SW}$ is more than 250 μs), the calculating unit 55 executes one calculation process for each single switching cycle $T_{SW}$.

2. Advantageous Effects of Third Embodiment

The third embodiment of the present invention provides the following effects in addition to those of the first embodiment of the present invention. The upper arm device connection period T1 and the first dead time dt1 for the phase arm that is the target of the current calculation (target phase arm) are calculated using the flag Flg_PREVIOUS-PHASE (PRESENT TIME) for the phase arm directly before the target phase arm in the current calculation process and also the flag Flg_PREVIOUS-PHASE(PREVIOUS TIME) for the phase arm directly before the target phase arm of the previous calculation process. In this way, a short circuit between the upper arm devices 81$u$, 81$v$, 81$w$ and the lower arm devices 82$u$, 82$v$, 82$w$ can be prevented more reliably.

As described above, in PFM control, a single calculation process by the converter controller 54 is executed for each of the phase arms UA, VA, WA, although only part of the drive signals UH, UL, VH, VL, WH, WL may be output. In other words, part of the resultant calculation results C may be not output as the drive signals UH, UL, VH, VL, WH, WL. Hence, in FIG. 24, if the calculation results C of the V-phase arm VA in the eleventh switching cycle $T_{SW}$ are determined on the basis that the flag Flg_U-PHASE(PRESENT TIME) of the eleventh switching cycle $T_{SW}$ is "1", i.e. assuming that the lower arm device connecting period T2 of the U-phase arm UA in the eleventh switching cycle $T_{SW}$ is zero, there is risk that a short circuit will occur between the upper arm device 81$u$ and the lower arm device 82$v$.

In the third embodiment of the present invention, however, the risk mentioned above can be avoided since the flag Flg_V-PHASE(PREVIOUS TIME) is utilized as well as the Flg_V-PHASE(PRESENT TIME).

D. Variations

The present invention is not limited to the embodiments described above, but can have various other configurations in view of the description of the present specification. For example, the following configurations (1) through (4) may be employed.

(1) Object to be Equipped with DC/DC Converter Apparatus 23

While the DC/DC converter apparatus 23 is incorporated into the fuel cell vehicle 20 in the embodiments described above, the present invention is not limited thereto, and the DC/DC converter apparatus 23 may be provided in other apparatus. For example, the DC/DC converter apparatus 23 can also be applied to battery driven vehicles (electric cars). The DC/DC converter apparatus 23 can also be applied to a so-called parallel or serial hybrid car that is equipped with an engine, a battery, and a motor. Further, the DC/DC converter apparatus 23 can also be incorporated into a household power system.

(2) Phase Arms UA, VA, WA

While the embodiments described above have employed phase arms UA, VA, WA of a three-phase type, single-phase, two-phase, or more than three-phase arrangements may be used. Further, the calculation results C may be determined in any order of the phase arms, and the phase arms may be controlled for ON/OFF in any given order.

(3) Dead Time dt

While the first dead time dt1 (the dead time dt between the end of the lower arm device connection period T2 in the previous switching cycle $T_{SW}$ and the beginning of the upper arm device connection period T1 in the current switching cycle $T_{SW}$) and the second dead time dt2 (the dead time dt between the end of the upper arm device connection period T1 in the current switching cycle $T_{SW}$ and the beginning of the lower arm device connection period T2 in the current switching cycle $T_{SW}$) are gradually reduced in the embodiments described above (see FIG. 11, for example), the first and second dead times dt1, dt2 may also be handled in other ways. For example, the second dead time dt2 may be left unreduced when the duty ratio is placed between the first duty ratio threshold DUT_TH1 and the second duty ratio threshold DUT_TH2, and may be set to zero when the duty ratio exceeds the second duty ratio threshold DUT_TH2.

Further, in each switching cycle $T_{SW}$, the upper arm device connection period T1 may be provided first, and followed by the dead time dt, the lower arm device connection period T2, and dead time dt in this order. Alternatively, the dead time dt, upper arm device connection period T1, dead time dt, lower arm device connection period T2, and dead time dt may be provided in this order, so that a configuration with three dead times dt is provided.

(4) Other

Figure 27:
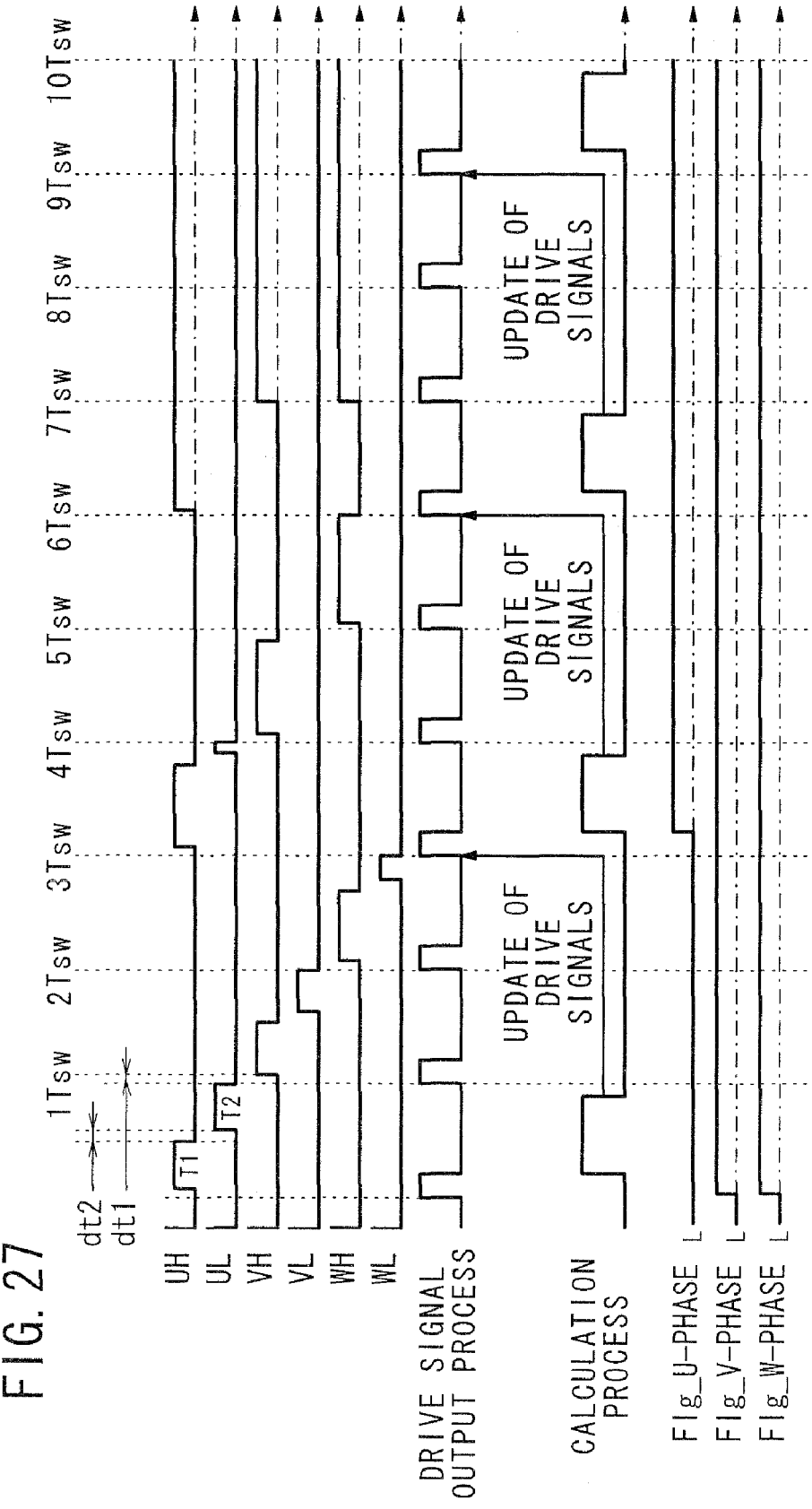
FIG. 27 is a diagram illustrating a variation of the timing chart shown in FIG. 11.

As shown in FIG. 27, in the direct couple region, all drive signals UH, VH, WH associated with the upper arm devices 81u, 81v, 81w may be made high.

The upper arm device 81 and/or the lower arm devices 82u to 82w may be turned on a plurality of times during a single switching cycle $T_{SW}$.

The number of the reactor 90 is not limited to one, and a reactor 90 may be connected to the midpoint of each of the U-phase arm UA, V-phase arm VA, and W-phase arm WA.

Figure 28:
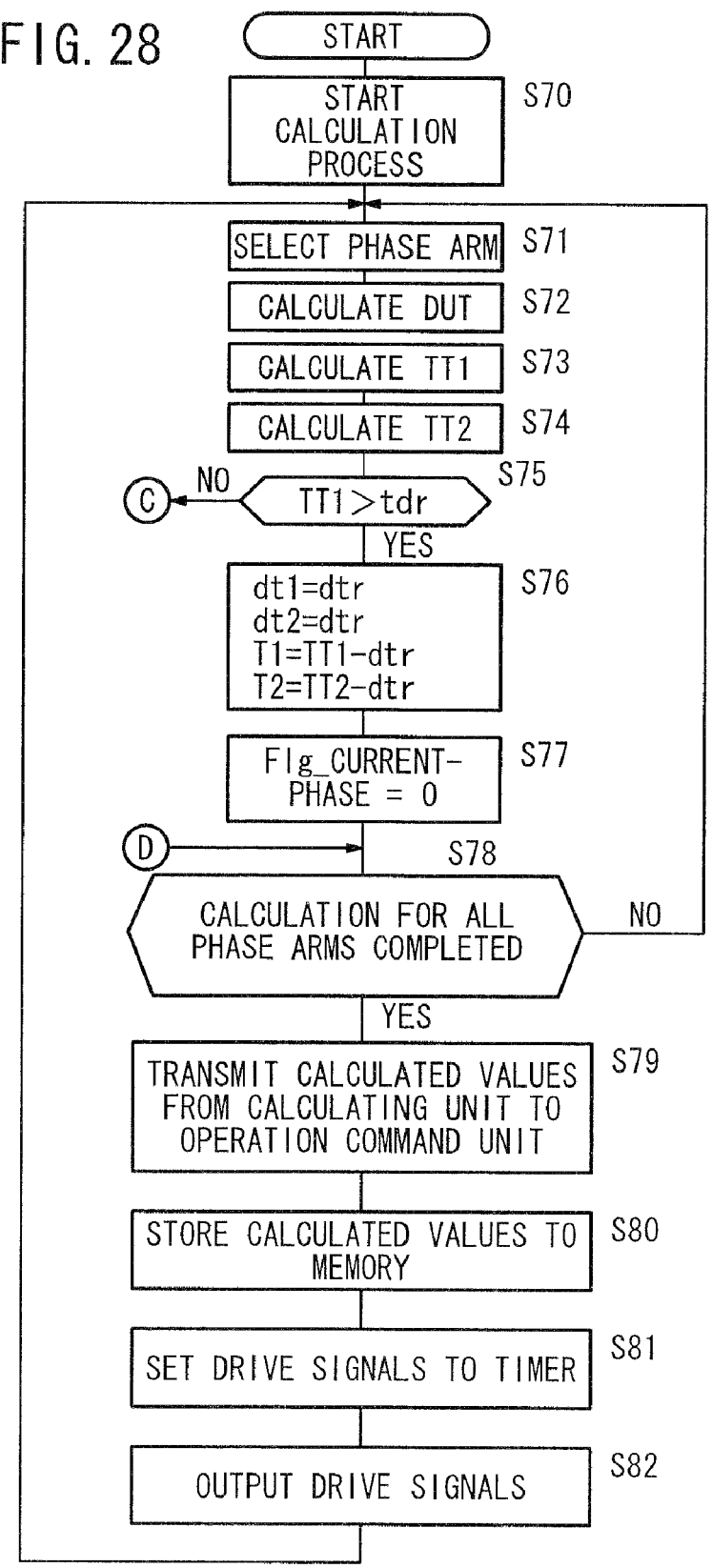
FIG. 28 is a first flow chart illustrating a variation of the process executed by the converter controller.
Figure 29:
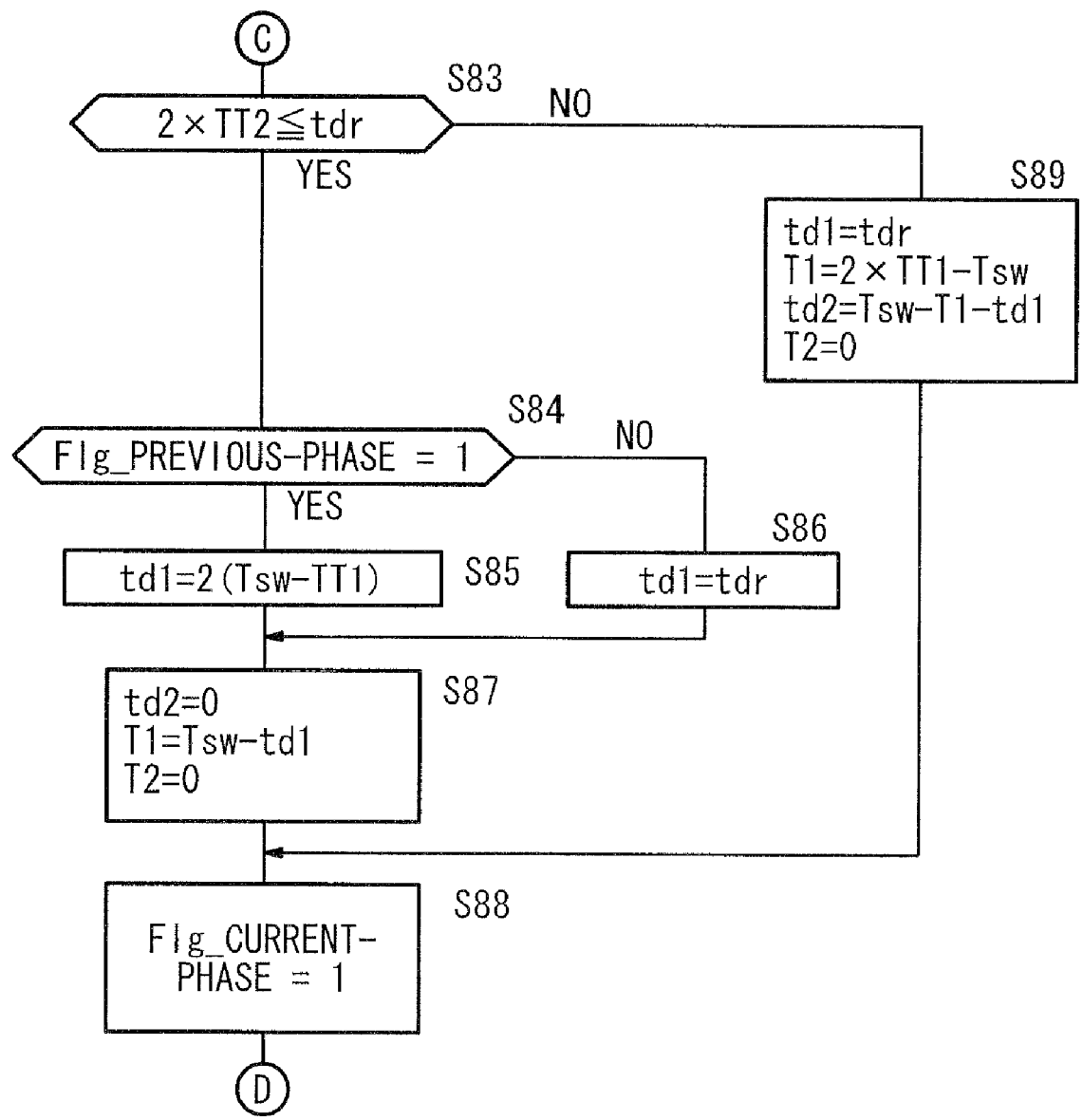
FIG. 29 is a second flow chart illustrating a variation of the process executed by the converter controller.

A flow chart such as that shown in FIGS. 28 and 29 can also be used. In this flow chart, S70-72 correspond to steps S10 to S12 in FIG. 9. TT1 in step S73 is an upper arm device side processing period, which is the sum of the upper arm device connection period T1 and the first dead time dt1, and is calculated by the calculating unit 55 based on the duty ratio DUT. Further, TT2 in step S74 is an lower arm device side processing period, which is the sum of the lower arm device connection period T2 and the second dead time dt2, and is calculated by the calculating unit 55 based on the duty ratio DUT. The upper arm device side processing period TT1 and the lower arm device side processing period TT2 are defined by the equations (9) and (10), respectively.

$$TT1 = T_{SW} \times DUT/100 \quad (9)$$

$$TT2 = T_{SW} - TT1 \quad (10)$$

If TT1 is not >tdr (step S75) then the processing depicted in FIG. 29 (discussed below) takes place. Otherwise, dt1=dtr, dt2=dtr, T1=TT1−dtr and T2=TT2−dtr in step S76. Flg_CURRENT-PHASE is set equal to 0 in step S77. If calculations for all the phase arms are completed in step S78 then the calculated values are transmitted from the calculating unit to the operation command unit in step S79. The calculated values are stored to memory in step S80, drive signals are set to timer in step S81 and drive signals are output in step S82.

If in step S75 TT1 is not >tdr, the processing depicted in FIG. 29 takes place. If 2×TT2 is less than or equal to tdr (step S83) then if Flg_PREVIOUS-PHASE=1 in step S84, td1=2 (Tsw−TT1) in step S85. Otherwise, if Flg_PREVIOUS-PHASE is not equal to 1 in step S84, td1=tdr in step S86. In step S87 td2=0, T1=Tsw−td1 and T2=0. If, on the other hand, 2×TT2 is not less than or equal to tdr in step S83, then in step S89 td1=tdr, T1=2×TT1−Tsw, td2=Tsw−T1−td1 and T2=0. In step S88 Flg_CURRENT-PHASE=1 and the processing returns to FIG. 28 step S78.

What is claimed is:

1. A method of controlling a DC/DC converter apparatus including a DC/DC converter connected between a first electric power device and a second electric power device, and having an upper arm device and a lower arm device; and a controller having a calculating unit and an operation command unit, the calculating unit calculating connection periods of the upper arm device and the lower arm device, and a dead time provided before connection of the upper arm device, the operation command unit alternately turning on and off the upper arm device and the lower arm device with the dead time provided therebetween, based on a calculation result of the calculating unit, the method comprising the steps of: in a permission judging unit of the calculating unit, determining, in a current calculation process, if the connection period of the lower arm device exists;

when it is determined that the connection period of the lower arm device exists, prohibiting, in a next calculation process, decreasing the dead time provided before the connection of the upper arm device; and when it is determined that no connection period of the lower arm device exists, permitting, in the next calculating process, decreasing the dead time provided before the connection of the upper arm device and increasing the connection period of the upper arm device.

2. The method of controlling a DC/DC converter apparatus according to claim 1, further comprising the steps of:

calculating, in the calculating unit, the connection periods of the upper arm device and the lower arm device and the dead time provided before the connection of the upper arm device for each of a plurality of switching cycles in a single calculation process, and transmitting calculation results to the operation command unit at one time;

storing, in the operation command unit, received calculation results into a plurality of memory units, separately and in association with an order of the plurality of switching cycles;

utilizing, in the operation command unit, the calculation results stored in the plurality of memory units to alternately turn on and off the upper arm device and the lower arm device; and calculating, in the calculating unit, the connection period of the upper arm device and the dead time provided before the connection of the upper arm device in the first switching cycle of the current calculation process, based on the connection period of the lower arm device in the last switching cycle of a previous calculation process.

3. The method of controlling a DC/DC converter apparatus according to claim 2, wherein the DC/DC converter apparatus includes a plurality of phase arms, each phase arm being made up of the upper arm device and the lower arm device, further comprising the steps of:

calculating, in the calculating unit, the connection periods of the upper arm device and the lower arm device and the dead time provided before the connection of the upper arm device for each of the plurality of phase arms in a single calculation process, and transmitting the calculation results to the operation command unit at one time;

storing, in the operation command unit, received calculation results into a plurality of memory units, separately and in association with each of the plurality of phase arms;

utilizing, in the operation command unit, the calculation results stored in the plurality of memory units to alternately turn on and off the upper arm device and the lower arm device of each of a plurality of phase arms; and calculating, in the calculating unit, the connection period of the upper arm device and the dead time provided before the connection of the upper arm device for a targeted phase arm analyzed in the current calculation process, using the connection period of the lower arm device of the phase arm operating directly before the targeted phase arm in the current calculation process and the connection period of the lower arm device of the phase arm operating directly before the targeted phase arm in the previous calculation process.

4. The method of controlling a DC/DC converter apparatus according to claim 1, further comprising the steps of:
   calculating, in the calculating unit, a dead time provided after the connection of the upper arm device;
   increasing, in the calculating unit, the connection period of the upper arm device as a specified duty ratio increases;
   utilizing, in the permission judging unit, a first duty ratio threshold at which the connection period of the lower arm device becomes zero, and a second duty ratio threshold that is greater than the first duty ratio threshold;
   if the specified duty ratio is between the first duty ratio threshold and the second duty ratio threshold, permitting decreasing the dead time provided after the connection of the upper arm device and increasing the connection period of the upper arm device, while prohibiting decreasing the dead time provided before the connection of the upper arm device; and
   if the specified duty ratio is between the second duty ratio and a possible maximum value of the duty ratio, permitting decreasing the dead time provided before the connection of the upper arm device and increasing the connection period of the upper arm device.

5. The method of controlling a DC/DC converter apparatus according to claim 1, wherein
   the DC/DC converter apparatus is incorporated in a vehicle,
   the first electric power device is a battery,
   the second electric power device is a fuel cell and a motor, and
   the DC/DC converter has a fuel cell output control mode that adjusts voltage between the fuel cell and the motor to control the output of the fuel cell, and a directly coupled mode that couples the battery, the fuel cell, and the motor without voltage conversion by the DC/DC converter, a drive signal in directly coupled mode being output continuously to the upper arm device but not the lower arm device.

6. A method of controlling a DC/DC converter apparatus including a DC/DC converter connected between a first electric power device and a second electric power device, and having an upper arm device and a lower arm device; and a controller having a calculating unit and an operation command unit, the calculating unit calculating connection periods of the upper arm device and the lower arm device, and dead times provided before and after connection of the upper arm device, based on a specified duty ratio, the operation command unit alternately turning on and off the upper arm device and the lower arm device with the dead times provided therebetween, based on a calculation result of the calculating unit, the method comprising the steps of: in the calculating unit,
   increasing the connection period of the upper arm device as the specified duty ratio increases;
   utilizing a first duty ratio threshold at which the connection period of the lower arm device becomes zero, and a second duty ratio threshold that is greater than the first duty ratio threshold;
   if the specified duty ratio is between the first duty ratio threshold and the second duty ratio threshold, prohibiting decreasing the dead time provided before the connection of the upper arm device; and
   if the specified duty ratio exceeds the second duty ratio threshold, permitting decreasing the dead time provided before the connection of the upper arm device.

7. The method of controlling a DC/DC converter apparatus according to claim 6, further comprising the steps of, if the specified duty ratio is between the first duty ratio threshold and the second duty ratio threshold, gradually decreasing the dead time provided after the connection of the upper arm device as the specified duty ratio increases, and thereby gradually increasing the connection period of the upper arm device.

8. The method of controlling a DC/DC converter apparatus according to claim 6, further comprising the steps of, if the specified duty ratio is between the second duty ratio threshold and a possible maximum value of the duty ratio, gradually decreasing the dead time provided before the connection of the upper arm device and gradually increasing the connection period of the upper arm device.

9. A method of controlling a DC/DC converter apparatus including a DC/DC converter connected between a first electric power device and a second electric power device, and having an upper arm device and a lower arm device; and a controller for alternately turning on and off, in each switching cycle, the upper arm device and the lower arm device with dead times provided therebetween, the method comprising the step of:
   when a connection period of the lower arm device is zero, keeping the upper arm device on by gradually decreasing the dead times over a plurality of the switching cycles, and finally making the dead times zero.

* * * * *